United States Patent
Sogabe

(10) Patent No.: US 8,827,783 B2
(45) Date of Patent: Sep. 9, 2014

(54) GAME DEVICE, GAME CONTROL METHOD AND RECORDING MEDIUM

(75) Inventor: Daisuke Sogabe, Toyonaka (JP)

(73) Assignee: Konami Digital Entertainment Co., Ltd, Tokyo (JP)

( * ) Notice: Subject to any disclaimer, the term of this patent is extended or adjusted under 35 U.S.C. 154(b) by 542 days.

(21) Appl. No.: 13/279,597

(22) Filed: Oct. 24, 2011

(65) Prior Publication Data

US 2012/0108303 A1 May 3, 2012

(30) Foreign Application Priority Data

Oct. 28, 2010 (JP) .................. 2010-242641

(51) Int. Cl.
*A63F 13/00* (2014.01)
*A63F 13/10* (2006.01)

(52) U.S. Cl.
CPC ........... *A63F 13/10* (2013.01); *A63F 2300/303* (2013.01); *A63F 2300/8011* (2013.01); *A63F 2300/646* (2013.01)
USPC ............................... 463/3; 463/43

(58) Field of Classification Search
CPC .............. A63F 13/06; A63F 2300/303; A63F 2300/8011
USPC ...................................... 463/3, 43
See application file for complete search history.

(56) References Cited

U.S. PATENT DOCUMENTS

| | | | | |
|---|---|---|---|---|
| 6,257,983 B1 * | 7/2001 | Rimoto | ............................ | 463/38 |
| 6,394,894 B1 * | 5/2002 | Okitsu et al. | ....................... | 463/3 |
| 6,398,647 B1 * | 6/2002 | Hirai et al. | ....................... | 463/31 |
| 6,494,783 B2 * | 12/2002 | Namba et al. | ....................... | 463/3 |
| 7,022,014 B2 * | 4/2006 | Namba et al. | ....................... | 463/4 |
| 7,361,084 B2 * | 4/2008 | Takahashi et al. | ................. | 463/3 |
| 7,878,890 B2 * | 2/2011 | Toyohara et al. | .................. | 463/3 |
| 8,012,003 B2 * | 9/2011 | Sterchi et al. | ....................... | 463/3 |
| 2006/0252478 A1 * | 11/2006 | Eto | .................... | 463/9 |
| 2006/0252541 A1 * | 11/2006 | Zalewski et al. | ................ | 463/36 |
| 2007/0213109 A1 * | 9/2007 | Sato et al. | .......... | 463/3 |
| 2007/0270215 A1 * | 11/2007 | Miyamoto et al. | .............. | 463/32 |
| 2008/0248872 A1 * | 10/2008 | Endo | ............... | 463/36 |
| 2008/0261692 A1 * | 10/2008 | Endo | ............... | 463/31 |
| 2009/0048019 A1 * | 2/2009 | Nagahama et al. | .............. | 463/34 |
| 2009/0069095 A1 * | 3/2009 | Uno | ............... | 463/43 |
| 2009/0170579 A1 * | 7/2009 | Ishii et al. | .......... | 463/2 |
| 2009/0181771 A1 * | 7/2009 | Sogabe | ............... | 463/38 |
| 2009/0227373 A1 * | 9/2009 | Yamamoto | .................... | 463/38 |
| 2009/0239652 A1 * | 9/2009 | Wang et al. | ..................... | 463/25 |
| 2010/0160042 A1 * | 6/2010 | Otsuka | ............... | 463/32 |
| 2010/0222143 A1 * | 9/2010 | Endo | ............... | 463/30 |

FOREIGN PATENT DOCUMENTS

JP 2007-222398 9/2007

* cited by examiner

*Primary Examiner* — Michael Cuff
(74) *Attorney, Agent, or Firm* — Jordan and Hamburg LLP

(57) ABSTRACT

Provided is a game device which sets a batter parameter of a batter character in relation to the batting of that batter character, and sets a first range where a ball-meeting cursor is positioned at the center, and moreover displaces and vibrates the ball-meeting cursor within the first range based on the batter parameter.

12 Claims, 13 Drawing Sheets

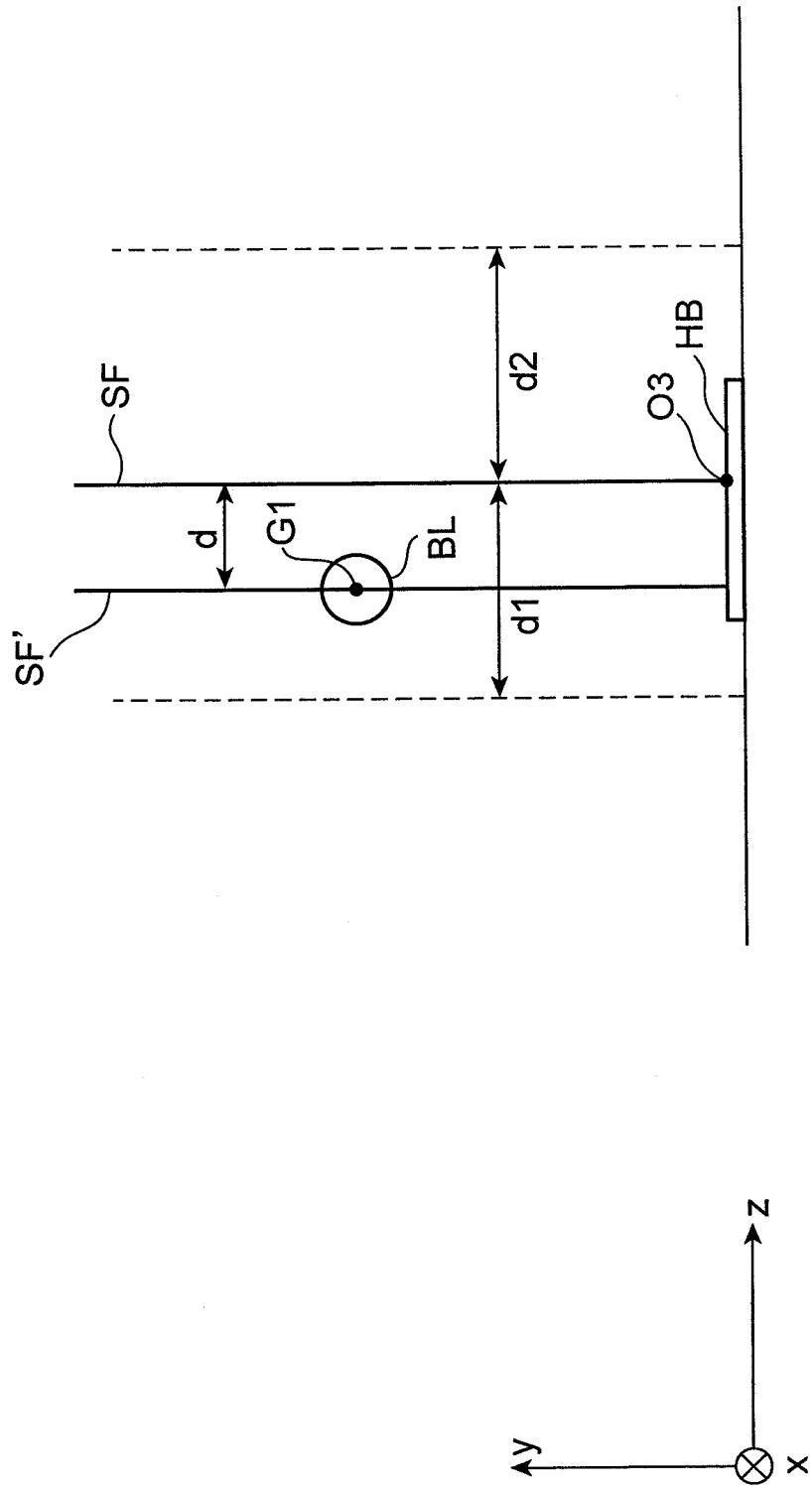

GAME DEVICE, GAME CONTROL METHOD AND RECORDING MEDIUM

BACKGROUND OF THE INVENTION

1. Field of the Invention

The present invention relates to a game device, a game control method and a computer-readable recording medium with a program recorded thereon for executing a baseball game where a batter character hits a ball object that is pitched by a pitcher character.

2. Description of the Related Art

Conventionally, known is a baseball game where various player characters including a pitcher character and a batter character are displayed on a display screen, and the batter character hits the ball object that was pitched by the pitcher character toward a strike zone (for example, Patent Document 1: JP2007-222398). In this kind of baseball game, the offensive game player performs bat control of the batter character by performing the batting operation while adjusting the position of the ball-meeting cursor showing the range where the ball object can be batted.

Normally, the size of the ball-meeting cursor is determined based on the capability value or the like of the batter character. For example, the size of the ball-meeting cursor is decreased as the capability value of the batter character is lower so that it becomes difficult to accurately contact the ball object.

Moreover, similar to the respective players being in a good or bad condition depending on the baseball game in the real world, there are games which attempt to improve the game element by setting the good/bad condition of the respective player characters for each baseball game in the game. With this kind of baseball game, normally, a slump of a player character is reflected by decreasing the capability value of a player character in a slump by a predetermined ratio. Here, the size of the ball-meeting cursor is set to be smaller than during a normal condition state based on the capability value that was decreased as a result of the slump of the batter character being reflected, and the game player can thereby realize the slump of the batter character.

Nevertheless, with a conventional baseball game, since the size of the ball-meeting cursor was merely changed by increasing or decreasing the capability value of the batter character within the device, there is a problem in that it is difficult for a game player who is familiar with the batting operation of adjusting the position of the ball-meeting cursor to realize the change in the increase or decrease of the capability value or the change in the good/bad condition. In other words, for a game player who is familiar with the batting operation, even if the size of the ball-meeting cursor is slightly changed and decreased, that game player can relatively easily cause the position of the ball-meeting cursor to coincide with the trajectory of the ball object, and the change in the increase or decrease of the capability value or the change in the good/bad condition is not accurately reflected as the difficulty of the actual batting operation.

SUMMARY OF THE INVENTION

The present invention was devised in view of the foregoing problems, and its object is to provide a game device, a game control method and a recording medium capable of realizing a highly amusing baseball game capable of accurately reflecting changes in the parameters concerning the batting of the batter character as the difficulty of the batting operation of the game player.

The game device according to one aspect of the present invention is a game device which executes a baseball game in which a batter character hits a ball object that is pitched by a pitcher character. This game device comprises a ball-meeting cursor position control unit which controls positioning of a ball-meeting cursor, in a game space, showing a range where the batter character can hit the ball object according to an operation of a game player, a batter parameter setting unit which sets a batter parameter of the batter character in relation to batting of that batter character, a first range setting unit which sets a first range where the ball-meeting cursor is positioned at the center, and a ball-meeting cursor vibration unit which displaces and vibrates the ball-meeting cursor within the first range based on the batter parameter.

Moreover, the game control method according to another aspect of the present invention is a game control method in which a computer controls a baseball game in which a batter character hits a ball object that is pitched by a pitcher character. This game control method includes: a ball-meeting cursor position control step in which the computer controls positioning of a ball-meeting cursor, in a game space, showing a range, where the batter character can hit the ball object, according to an operation of a game player; a batter parameter setting step in which the computer sets a batter parameter of the batter character in relation to the batting of that batter character; a first range setting step in which the computer sets a first range where the ball-meeting cursor is positioned at the center; and a ball-meeting cursor vibration step in which the computer displaces and vibrates the ball-meeting cursor within the first range based on the batter parameter.

Moreover, the recording medium according to yet another aspect of the present invention is a computer-readable recording medium recorded with a program which causes a computer including a baseball game where a batter character hits a ball object that is pitched by a pitcher character to execute: a ball-meeting cursor position control function which controls positioning of a ball-meeting cursor, in a game space, showing a range, where the batter character can hit the ball object, according to an operation of a game player; a batter parameter setting function which sets a batter parameter of the batter character in relation to the batting of that batter character; a first range setting function which sets a first range where the ball-meeting cursor is positioned at the center; and a ball-meeting cursor vibration function which displaces and vibrates the ball-meeting cursor within the first range based on the batter parameter.

BRIEF DESCRIPTION OF THE DRAWINGS

FIG. 5 is an explanatory diagram which views the virtual three-dimensional space shown in FIG. 4 from the x-axis direction;

DESCRIPTION OF THE PREFERRED EMBODIMENTS

The invention is now described, by way of example, with reference to the accompanying drawings.

[Outline of the Game Device]

The game device according to an embodiment of the present invention uses technology of vibrating the ball-meeting cursor displayed in the game space within a predetermined range (first range) so that changes in the batter parameter concerning the batting of the batter character can be accurately reflected in the batting operation of the game player. By vibrating the ball-meeting cursor as described above, it will not be easy, even for a game player who is familiar with the batting operation, to match the position of the ball-meeting cursor to the trajectory of the ball object that was pitched, and the difficult of making contact with the ball object or the difficulty of controlling the batter character can be reflected in the game regardless of the game player's operational skills.

As examples of the batter parameters concerning the batting of the batter character, there are a basic capability parameter showing the basic capability of the batter character, a condition parameter showing the state of the good/bad condition of the batter character, a battering characteristic parameter on the skillfulness and unskillfulness of the batter character in relation to the pitching zone, a mental parameter which changes according to the battering average history of the batter character during the game, and the like. As a result of switching the vibration or non-vibration of the ball-meeting cursor or changing the size of the vibration range or vibration speed when performing the vibration based on one or two or more parameters among the batter parameters, the ease/difficulty of the batting operation of the game player is effectively created according to the contents of the batter parameter.

The configuration of the game device according to this embodiment is now explained in detail.

[Configuration of Game Device]

Figure 1:
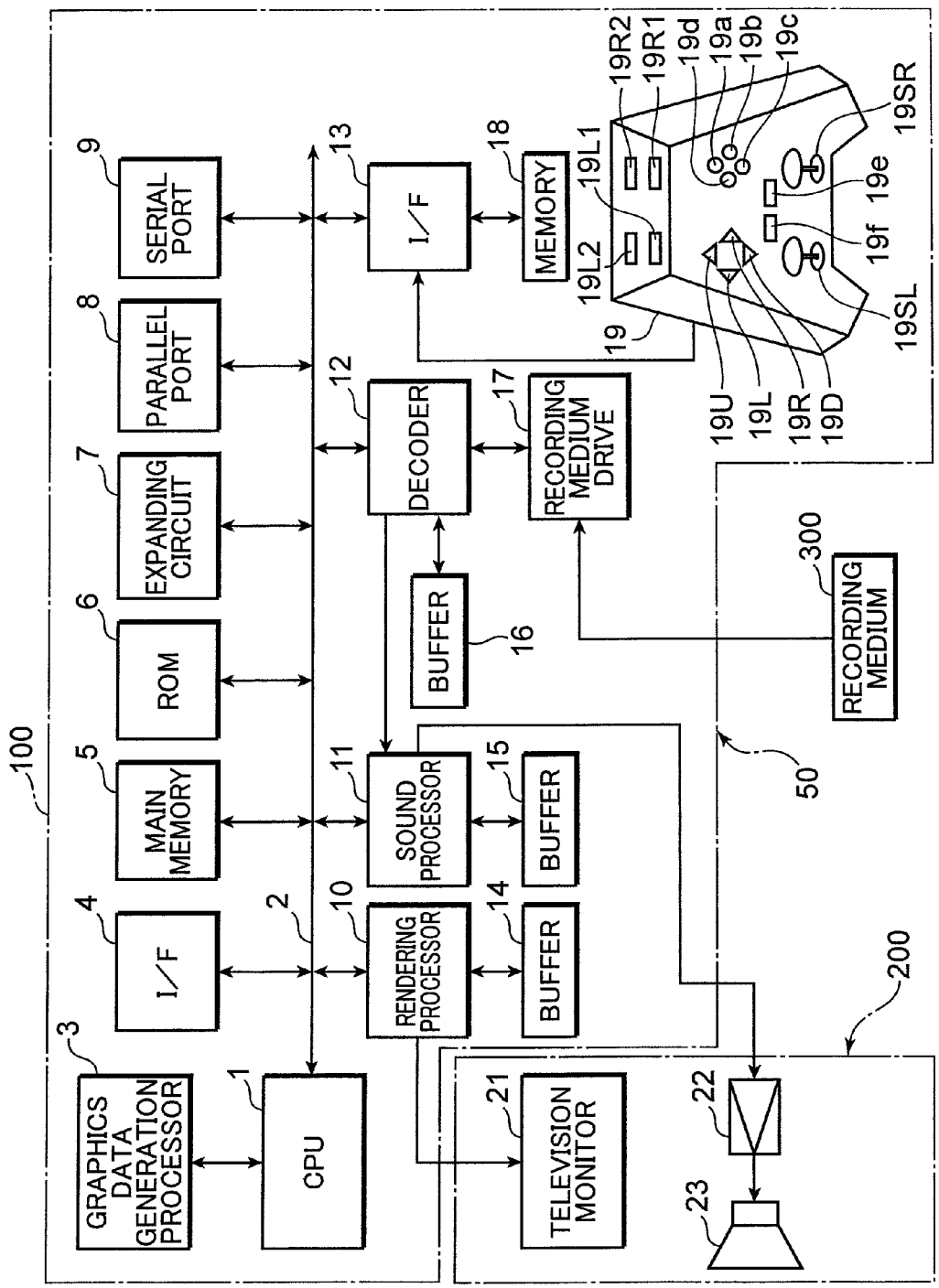
FIG. 1 is a block diagram showing the configuration of the game device of an embodiment of the present invention.

FIG. 1 is a block diagram showing the configuration of the game device according to an embodiment of the present invention. Not that, in the ensuing explanation, a domestic video game device configured by connecting a domestic video game machine to a domestic television is explained as an example of the game device, the present invention is not limited thereto, and can also be applied to a portable game device or mobile phone configured integrally with a monitor, or a personal computer or the like that functions as a game device as a result of executing the game control program of the present invention.

The game device shown in FIG. 1 comprises a domestic game machine 100 and a television 200. The domestic game machine 100 is loaded with a computer-readable recording medium 300 having a game program recorded thereon, and the game is executed by the game program being read as needed.

The domestic game machine 100 includes a CPU (Central Processing Unit) 1, a bus line 2, a graphics data generation processor 3, an interface circuit (IN) 4, a main memory 5, a ROM (Read Only Memory) 6, an expanding circuit 7, a parallel port 8, a serial port 9, a rendering processor 10, a sound processor 11, a decoder 12, an interface circuit (I/F) 13, buffers 14 to 16, a recording medium drive 17, a memory 18, and a controller 19. The television 200 includes a television monitor 21, an amplification circuit 22 and a speaker 23.

The CPU 1 is connected to the bus line 2 and the graphics data generation processor 3. The bus line 2 includes an address bus, a data bus, a control bus and the like, and mutually connects the CPU 1, the interface circuit 4, the main memory 5, the ROM 6, the expanding circuit 7, the parallel port 8, the serial port 9, the rendering processor 10, the sound processor 11, the decoder 12 and the interface circuit 13.

The rendering processor 10 is connected to the buffer 14. The sound processor 11 is connected to the buffer 15 and the amplification circuit 22. The decoder 12 is connected to the buffer 16 and the recording medium drive 17. The interface circuit 13 is connected to the memory 18 and the controller 19.

The television monitor 21 of the television 200 is connected to the rendering processor 10. The speaker 23 is connected to the amplification circuit 22.

Moreover, when the game device is configured based on a personal computer, a workstation or the like, the television monitor 21 or the like corresponds to a computer display. Moreover, the expanding circuit 7, the rendering processor 10, the sound processor 11 and the like respectively correspond to a part of the data of the game control program recorded on the recording medium 300 or the hardware on the expansion board that is inserted into the expansion slot of the computer. Moreover, the interface circuit 4, the parallel port 8, the serial port 9 and the interface circuit 13 correspond to the hardware on the expansion board that is inserted into the expansion slot of the computer. Moreover, the buffers 14 to 16 respectively correspond to the respective storage areas of the main memory 5 or the expanded memory.

The respective constituent elements shown in FIG. 1 are now explained. The graphics data generation processor 3 plays the role of the co-processor of the CPU 1 so to speak. In other words, the graphics data generation processor 3 performs coordinate conversion and light source calculation; for example, the computation of a fixed-point format matrix or vector based on parallel processing.

As the main processing that is performed by the graphics data generation processor 3, there are, for example, processing of obtaining the address data of the image to be processed on a predetermined display area and returning this to be CPU 1 based on the coordinate data, travel distance data, and rotation data of the respective vertices in a two-dimensional or three-dimensional space of the image data supplied by the CPU 1, and processing of calculating the brightness of the image according to the distance from the light source that was virtually set.

The interface circuit 4 is used as the interface of a peripheral device; for example, a pointing device such as a mouse or a track ball. The main memory 5 is configured from a RAM (Random Access Memory) or the like. The ROM 6 stores program data to become the operating system of the game device.

The expanding circuit 7 performs expansion processing to a compressed image that was compressed based on intra coding that is compliant with the MPEG (Moving Picture Experts Group) for moving pictures and the JPEG (Joint Photographic Experts Group) standard for still pictures. The expansion processing includes decode processing (VLC: decoding of data that was encoded based on the Variable Length Code), inverse quantization processing, IDCT (Inverse Discrete Cosine Transform) processing, intra image restoration processing, and the like.

The rendering processor 10 performs the rendering processing to the buffer 14 based on the rendering command that is issued by the CPU 1 each predetermined time T (for example, T=1/60 seconds per frame).

The buffer 14 is configured, for example, from a RAM, and is divided into a display area (frame buffer) and a non-display area. The display area is configured with the deployment area of the image data to be displayed on the display screen of the television monitor 21. The non-display area is configured from data which defines a skeleton, model data which defines polygons, animation data which causes the model to move, pattern data showing the contents of the respective animations, texture data, color pallet data and other storage area.

Here, the texture data is two-dimensional image data. The color pallet data is data for designating the color of texture data or the like. The CPU 1 records such data in the non-display area of the buffer 14 in advance collectively from the recording medium 300, or separately on a plurality of occasions according to the progress of the game.

Moreover, as the rendering command, there is a rendering command for rendering a stereoscopic image using polygons, or a rendering command for rendering a standard two-dimensional image. Here, the polygons are polygonal two-dimensional virtual diagrams and, for example, triangles and quadrangles are used.

The rendering command for rendering a stereoscopic image using polygons is performed respectively to the polygon vertex address data showing the storage position on the display area of the buffer 14 of the polygon vertex coordinate data, the texture address data showing the storage position on the buffer 14 of the texture that is attached to the polygons, the color pallet address data showing the storage position on the buffer 14 of the color pallet data showing the color of the texture, and the brightness data showing the brightness of the texture.

The polygon vertex address data on the display area among the foregoing data is data that was substituted by the polygon vertex coordinate data in a two-dimensional space by the graphics data generation processor 3 performing coordinate conversion to the polygon vertex coordinate data in a three-dimensional space from the CPU 1 based on travel distance data and rotation data. The brightness data is determined by the graphics data generation processor 3 based on the distance from the position that is shown by the polygon vertex coordinate data, which was subject to the foregoing coordinate conversion, from the CPU 1, to the virtually disposed light source.

The polygon vertex address data shows the address on the display area of the buffer 14. The rendering processor 10 performs the write processing of texture data corresponding to the scope of the display area of the buffer 14 shown with three polygon vertex address data.

Objects such as characters in the game space are configured from a plurality of polygons. The CPU 1 associates the coordinate data of the respective polygons in the three-dimensional space with the vector data of the corresponding skeleton and stores this in the buffer 14. In addition, when moving the character on the display screen of the television monitor 21 based on the operation of the controller 19 described later, the following processing is performed upon expressing the movement of the character or changing the viewpoint position of viewing the character.

Specifically, the CPU 1 provides, to the graphics data generation processor 3, the three-dimensional coordinate data of the vertex of the respective polygons retained in the non-display area of the buffer 14, and the travel distance data and rotation data of the respective polygons that were obtained from the coordinates of the skeleton and the rotation data thereof.

The graphics data generation processor 3 sequentially obtains the three-dimensional coordinate data after the movement and after the rotation of the respective polygons based on the three-dimensional coordinate data of the vertex of the respective polygons and the travel distance data and rotation data of the respective polygons.

The coordinate data of the horizontal and vertical directions among the three-dimensional coordinate data of the respective polygons that were obtained as described above is provided as address data on the display area of the buffer 14; that is, as the polygon vertex address data, to the rendering processor 10.

The rendering processor 10 writes the texture data shown with the texture address data that is pre-assigned on the display area of the buffer 14 as shown by the three polygon vertex address data. Consequently, an object in which texture is attached to numerous polygons is displayed on the display screen of the television monitor 21.

The rendering command for rendering a standard two-dimensional image is performed to the vertex address data, the texture address data, the color pallet address data showing the storage position on the buffer 14 of the color pallet data showing the color of the texture data, and the brightness data showing the brightness of the texture. Among the foregoing data, the vertex address data is obtained by the graphics data generation processor 3 performing coordinate conversion to the vertex coordinate data in the two-dimensional plane from the CPU 1 based on the travel distance data and rotation data from the CPU 1.

The sound processor 11 stores, in the buffer 15, the ADPCM (Adaptive Differential Pulse Code Modulation) data that was read from the recording medium 300, and the ADPCM data stored in the buffer 15 becomes the sound source.

Moreover, the sound processor 11 reads the ADPCM data from the buffer 15, for example, based on a block signal having a frequency of 44.1 kHz. The sound processor 11 performs the processing of converting the pitch, adding noise, setting the envelope, setting the level and adding reverb to the ADPCM data that was read.

When the sound data read from the recording medium 300 is PCM (Pulse Code Modulation) data of CD-DA (Compact Disk Digital Audio) or the like, the sound processor 11 converts this sound data into ADPCM data. Moreover, the processing of the PCM data based on a program is directly performed on the main memory 5. The PCM data that was processed on the main memory 5 is supplied to the sound processor 11 and converted into ADPCM data. Subsequently, the various types of processing described above are performed, and sound is output from the speaker 23.

As the recording medium drive 17, for example, a DVD-ROM drive, a CD-ROM drive, a hard disk drive, an optical disk drive, a flexible disk drive, a silicon disk drive, a cassette medium readable machine or the like is used. Here, as the recording medium 300, a DVD-ROM, a CD-ROM, a hard disk, an optical disk, a flexible disk, a semiconductor memory or the like is used.

The recording medium drive 17 reads the image data, sound data and program data from the recording medium 300, and supplies the read data to the decoder 12. The decoder 12 performs error correction processing based on ECC (Error Correction Code) to data that was reproduced from the recording medium drive 17, and supplies the data that was subject to the error correction processing to the main memory 5 or the sound processor 11.

As the memory 18, for example, a card-type memory is used. A card-type memory is used, for example, to maintain the various game parameters at the time that the game is paused such as when pausing the game and retaining the status at the time the game is paused.

The controller 19 is an operation device that is used by the game player as the operator for inputting various operation commands, and sends operation signals according to the game player's operation to the CPU 1. The controller 19 is provided with a first button 19*a*, a second button 19*b*, a third button 19*c*, a fourth button 19*d*, an up direction key 19U, a down direction key 19D, a left direction key 19L, a right direction key 19R, an L1 button 19L1, an L2 button 19L2, an R1 button 19R1, an R2 button 1982, a start button 19*e*, a select button 19*f*, a left stick 19SL and a right stick 19SR.

The up direction key 19U, the down direction key 19D, the left direction key 19L and the right direction key 19R are used, for example, to provide, to the CPU 1, commands for moving the character or the cursor vertically or horizontally on the screen of the television monitor 21.

The start button 19*e* is used for commanding the CPU 1 to load the game program from the recording medium 300. The select button 19*f* is used for commanding the CPU 1 to make various selections concerning the game program that is loaded from the recording medium 300 to the main memory 5.

The respective buttons and respective keys of the controller 19 excluding the left stick 19SL and the right stick 19SR are configured as ON/OFF switches which are turned ON when they are pressed from their neutral position based on external pressing force, and turned OFF when the pressing force is released and they are returned to their neutral position.

The left stick 19SL and the right stick 19SR are stick-type controllers which are basically configured the same as a so-called joystick. The stick-type controller includes an upstanding stick, and is configured so that it can be tilted 360°, including front/back and left/right, with a predetermined position of the stick as the fulcrum. The left stick 19SL and the right stick 19SR send as the operational signals, to the CPU 1 via the interface circuit 13, values of the x coordinates of the left/right direction and the y coordinates of the front/back direction with the upstanding position as the origin according to the tilting direction and tilting angle of the stick.

Note that the first button 19*a*, the second button 19*b*, the third button 19*c*, the fourth button 19*d*, the L1 button 19L1, the L2 button 19L2, the R1 button 19R1 and the R2 button 19R2 are used for the various functions according to the game control program that is loaded from the recording medium 300.

The outline of the operation of the foregoing game device is now explained. When the recording medium 300 is loaded in the recording medium drive 17 and the power switch (not shown) is turned ON and power is applied to the game device, the CPU 1 commands the recording medium drive 17 to read the game program from the recording medium 300 based on the operating system stored in the ROM 6. Consequently, the recording medium drive 17 reads the image data, sound data and program data from the recording medium 300. The read image data, sound data and program data are supplied to the decoder 12, and the error correction processing is performed to the various data by the decoder 12.

The image data that was subject to the error correction processing by the decoder 12 is supplied to the expanding circuit 7 via the bus line 2. The image data that was subject to the foregoing expansion processing by the expanding circuit 7 is supplied to the rendering processor 10, and written into the non-display area of the buffer 14 by the rendering processor 10. The sound data that was subject to the error correction processing by the decoder 12 is written into the buffer 15 via the main memory 5 or the sound processor 11. The program data that was subject to the error correction processing by the decoder 12 is written into the main memory 5.

Subsequently, the CPU 1 advances the game based on the game control program stored in the main memory 5 and the contents that are instructed by the game player using the controller 19. Specifically, the CPU 1 performs the control of image processing, the control of sound processing, the control of internal processing and the like based on the contents that are instructed by the game player using the controller 19.

As the control of image processing, for example, performed are the calculation of the coordinates of the respective skeletons from the pattern data corresponding to the animation instructed by the character or the calculation of the vertex coordinate data of the polygons, the supply of the obtained three-dimensional coordinate data and viewpoint position data to the graphics data generation processor 3, and the issue of the rendering command including the address data on the display area of the buffer 14 and the brightness data which were obtained by the graphics data generation processor 3.

As the control of sound processing, for example, performed are the issue of a sound output command to the sound processor 11, and the designation of the level, reverb and the like. As the control of internal processing, for example, performed are the computation according to the operation of the controller 19, and so on.

Figure 3:
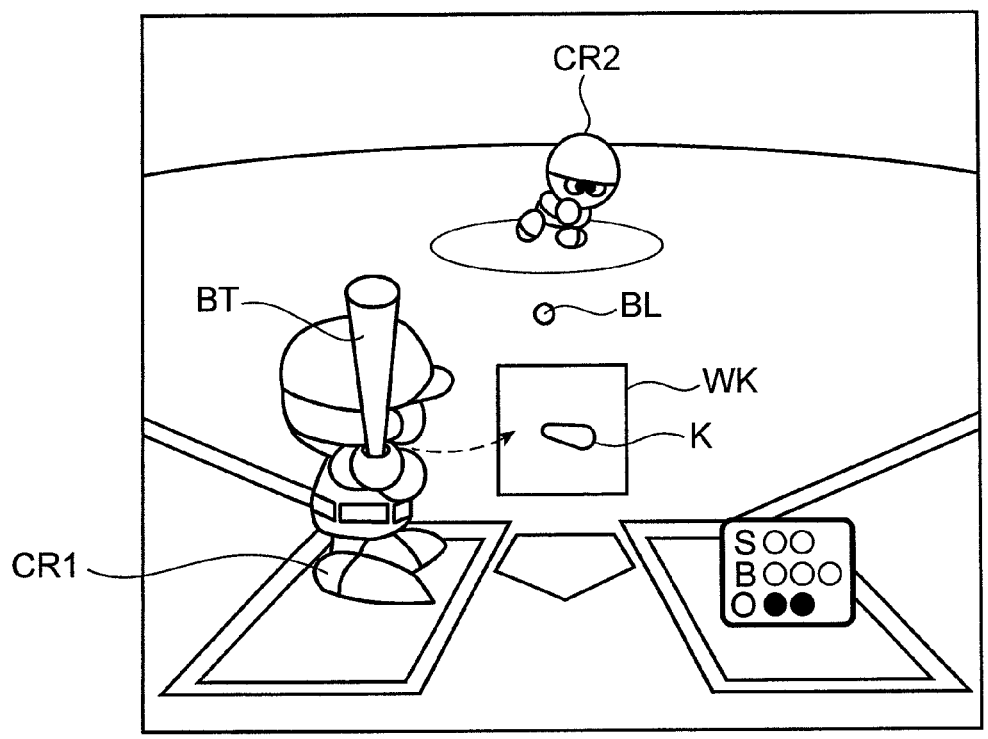
FIG. 3 is a screen diagram explaining the outline of the baseball game that is executed by the game device of this embodiment.

The baseball game that is executed based on the game program recorded in the recording medium 300 is now explained. FIG. 3 is a screen diagram explaining the outline of the baseball game that is executed by the game device according to this embodiment. This is a baseball game in which the batter character CR1 hits the ball object BL that was pitched by the pitcher character CR2 in the game space, which is a virtual three-dimensional space. Specifically, this is a baseball game where the pitcher character CR2 pitches the ball object BL, and the batter character CR1 hits the ball object BL using the bat object BT.

With this baseball game, the game player playing offense operates the controller 19 and moves the ball-meeting cursor K, which is displayed within the outline box WK showing the strike zone, on the display screen and thereby adjusts its position. Subsequently, when the ball object BL approaches the home base, the game player positions the ball-meeting cursor K so that the ball object BL and the ball-meeting cursor K become overlapped, and the inputs the batting command. Consequently, an image where the batter character CR1 swings the bat object BT in a direction according to the position of the ball-meeting cursor K is displayed. Here, if the ball object BL and the ball-meeting cursor K are overlapped in a well-timed manner, it is deemed that the bat made contact with the ball, and the ball object BL is hit back.

[Functional Configuration of Game Device]

Figure 2:
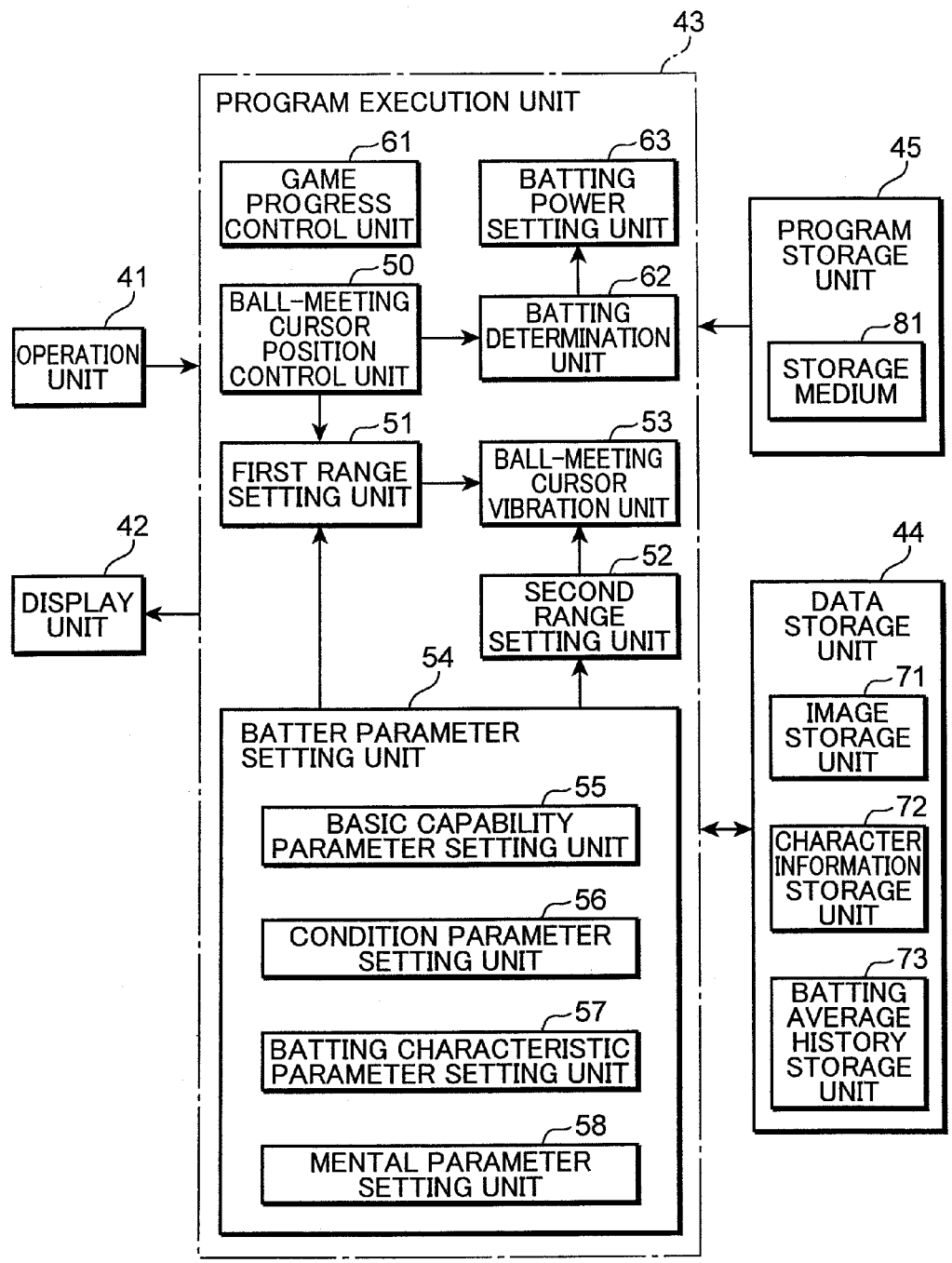
FIG. 2 is a main functional block diagram of the game device shown in FIG. 1.

The main functions of the game device upon playing the baseball game by using the game device configured as described above are now explained. FIG. 2 is a main functional block diagram of the game device shown in FIG. 1.

As shown in FIG. 2, the game device functionally comprises an operation unit 41, a display unit 42, a program execution unit 43, a data storage unit 44 and a program storage unit 45.

The operation unit 41 is configured from the controller 19 and the like, and receives the various operational inputs by the game player which are required upon advancing the game. In this embodiment, for example, when the game player is playing offense, the operation unit 41 is input with move commands for moving the ball-meeting cursor K and batting commands for determining the timing of hitting the ball object BL. Moreover, when the game player is playing defense, the operation unit 41 receives the pitching start command for starting the pitching motion of the pitcher character CR2 and the zone setting command for setting the zone of the ball object BL.

The display unit 42 is configured from the television 200 shown in FIG. 1, and displays various images based on the control of the program execution unit 43.

The program execution unit 43 is configured from the CPU 1, the graphics data generation processor 3 and the like shown in FIG. 1, and comprises a ball-meeting cursor position control unit 50, a first range setting unit 51, a second range setting unit 52, a ball-meeting cursor vibration unit 53, a batter parameter setting unit 54, a game progress control unit 61, a batting determination unit 62 and a batting power setting unit 63.

The ball-meeting cursor position control unit 50 controls the positioning, in the game space, of the ball-meeting cursor K showing the range where the batter character CR1 can hit the ball object BL according to the game player's operation of the operation unit 41.

Figure 7:
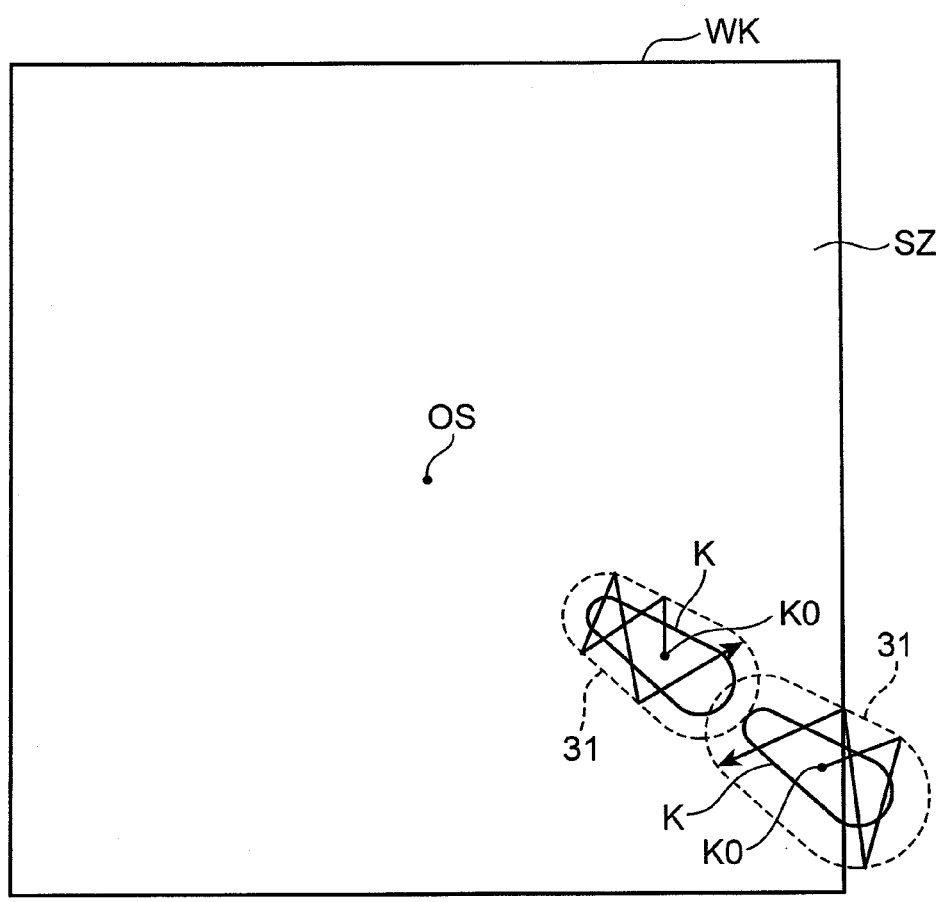
FIG. 7 is an explanatory diagram explaining the setting example of the first range with the ball-meeting cursor positioned at the center.

As illustrated in FIG. 7, the first range setting unit 51 sets the first range 31 where the ball-meeting cursor K is positioned at the center K0 (center coordinate). The first range 31 is the range where the ball-meeting cursor K is vibrated, and the center K0 of the ball-meeting cursor K is displaced to be more inside than the outer peripheral boundary of the first range 31. Normally, the outer peripheral boundary of the ball-meeting cursor K is not displayed on the screen.

As an example of the size of the first range 31 that is set by the first range setting unit 51, it may be a size where the ball-meeting cursor K is displaced from the center K0 in a measurement of substantially the diameter of the ball object BL based on vibration. As a result of causing the ball-meeting cursor K to vibrate within a range of being displaced approximately in the amount of the diameter (that is, one ball worth) of the ball object BL, it becomes possible to create a situation where, although the game player may not swing and miss, it will be difficult to successfully match the center of the ball-meeting cursor K to the ball object BL (that is, it will be difficult to make contact with the ball with the sweet spot of the bat), and lead to a mishit.

Moreover, by further increasing the size of the first range 31 and causing the ball-meeting cursor K to be vibrated within a range that is displaced a distance that is longer than the diameter (that is, one ball worth) of the ball object BL, it becomes possible to create a situation where the game player will more easily end up with a mishit or a swing and a miss.

Note that, when the game player swings and misses in a ball count other than two strikes, the game player will be given another opportunity at bat. However, when considering that the game player will strike out if he/she swings and misses in a ball count of two strikes, it is possible to cause the ball-meeting cursor K to vibrate within a range of approximately the diameter of the ball object BL up to a ball count of two strikes, and cause the ball-meeting cursor K to vibrate within a range that is displaced a distance that is longer than the diameter of the ball object BL when the ball count becomes two strikes. As a result of changing the size of the first range 31 based on the ball count as described above, for instance, the game player will be able to definitely realize the difficulty of controlling the batter character during a bad condition.

Moreover, the first range setting unit 51 is configured to set the first range 31 to be greater as the ball-meeting cursor K is positioned farther outward from the center OS of the strike zone SZ. This is because, in the real world also, since it becomes more difficult for the batter to make contact with the ball as the ball is more outside the strike zone SZ from the center of the strike zone SZ (and more so as the ball is in a ball zone that is farther from the strike zone SZ), a similar situation is also reflected in the game in order to create a realistic feeling. In other words, as shown in FIG. 7, when the ball object BL is pitched near the middle of the strike zone SZ, the game player performs the operation of moving the ball-meeting cursor K near the middle of the strike zone SZ. Thus, by reducing the range of oscillation of the ball-meeting cursor K as the ball-meeting cursor K is positioned closer to the middle of the strike zone SZ based on the foregoing operation, the game player can more easily make contact with the ball object BL using the ball-meeting cursor K. Meanwhile, when the ball object BL is pitched to a difficult-to-hit zone (including the zone of the ball zone) away from the middle of the strike zone SZ, the game player performs the operation of moving the ball-meeting cursor K to a position away from the middle of the strike zone SZ. Thus, by increasing the range of oscillation of the ball-meeting cursor K as the ball-meeting cursor K is distanced from the middle of the strike zone SZ based on the foregoing operation, it becomes more difficult for the game player to make contact with the ball object BL using the ball-meeting cursor K.

Moreover, the first range setting unit 51 also has the function of changing the size of the first range 31 based on the batter parameters (basic capability parameter, condition parameter, batting characteristic parameter, mental parameter and the like), and this will be explained in detail later.

Figure 8:
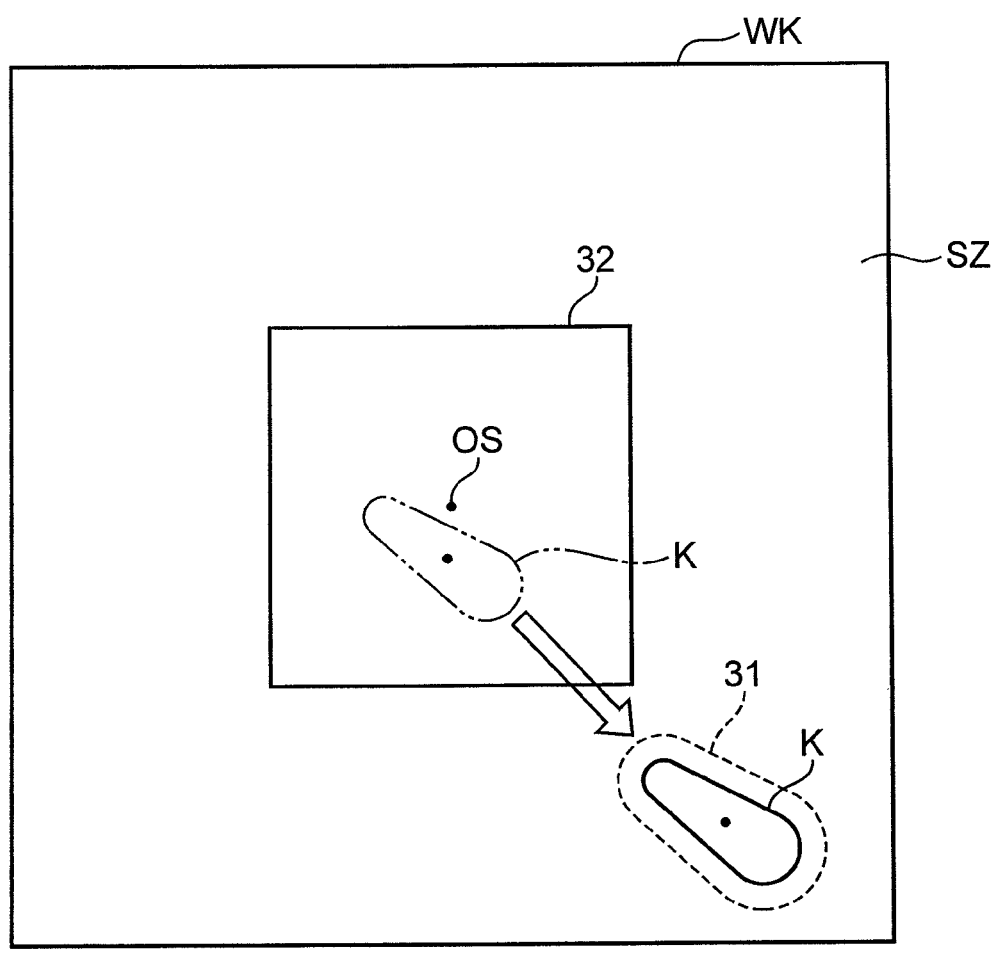
FIG. 8 is an explanatory diagram explaining the setting example of the second range that is set to the center part of the strike zone.

As illustrated in FIG. 8, the second range setting unit 52 sets a second range 32 including the center OS of the strike zone SZ in the outline box WK of the strike zone SZ. The second range 32 is set at the center of the strike zone SZ as the range where the ball-meeting cursor K is not vibrated, and the ball-meeting cursor K is not vibrated when the ball-meeting cursor K is positioned (center K0 of the ball-meeting cursor K exists) in the second range 32, and the ball-meeting cursor K is vibrated only when the ball-meeting cursor K is positioned outside the second range 32.

This is because, in the real world also, even when the player's basic capability is relatively low or that player's condition is bad, it is unlikely that the player will mishit an easy ball that is pitched near the middle of the strike zone. Thus, the same circumstances are also reflected in the game in order to create a realistic feeling. In other words, when the ball object BL is pitched near the middle of the strike zone SZ, the game player performs the operation of moving the ball-meeting cursor K near the middle of the strike zone SZ. Thus, when the ball-meeting cursor K is positioned within the second range 32 based on the foregoing operation, the game player can easily make the ball-meeting cursor K contact with the ball object BL as a result of the ball-meeting cursor K not being vibrated. Meanwhile, when the ball object BL is pitched to a difficult-to-hit zone (including the zone of the ball zone) that is away from the middle of the strike zone SZ, the game player will perform the operation of moving the ball-meeting cursor K to a position away from the middle of the strike zone SZ. Thus, when the ball-meeting cursor K is positioned outside the second range 32 based on the foregoing operation, the ball-meeting cursor K is vibrated so that it will be difficult for the game player make the ball-meeting cursor K contact with the ball object BL.

The batter parameter setting unit 54 sets the batter parameters of the batter character regarding the batting of that batter character. The batter parameter setting unit 54 comprises a basic capability parameter setting unit 55, a condition parameter setting unit 56, a batting characteristic parameter setting unit 57 and a mental parameter setting unit 58.

The basic capability parameter setting unit 55 sets the basic capability parameter showing the basic capability of the batter character to the respective batter characters that are used in the ball game. As the basic capability parameter, it may be one parameter as a generalization of the contact ability and power (slugging ability), or it may be configured from a plurality of parameters such as the contact ability, power and the like. The various types of information of the respective batter characters are stored in advance in the character information storage unit 72 of the data storage unit 44, and the basic capability parameter setting unit 55 reads the information concerning the basic capability parameter of the respective batter characters from the character information storage unit 72, and sets the basic capability parameter to the respective batter characters that are used in the ball game.

The condition parameter setting unit 56 sets the condition parameter showing the state of the good/bad condition of the batter character to the respective batter characters that are used in the ball game. This is because, in the real world also, the player's good/bad condition has ups and downs, and even a player with a high basic capability does not necessarily achieve great results each ball game. Thus, in the game also, the status of the good/bad condition of the batter character is reflected in each ball game. For example, the five-level parameters of excellent condition, good condition, normal condition, bad condition, and terrible condition are prepared as the condition parameter, and the condition parameter setting unit 56 sets the condition parameter to the respective batter characters by drawing the parameter for each ball game. Note that the condition parameter is not limited to five levels, and can also be set to four levels or less or six levels or more. Moreover, rather than setting the condition parameter of the respective batter characters for each ball game, the condition parameter can also be re-set for every n-number of ball games (n is a nature number of 2 or more).

The batting characteristic parameter setting unit 57 sets the batting characteristic parameter to the respective batter characters regarding the skillfulness and unskillfulness of the batter character in relation to the pitching zone. This is because, in the real world also, the players have skillful and unskillful pitching zones such as being skillful at the outside corner zone but being unskillful at the inside corner zone. Thus, even in the game, the skillfulness and unskillfulness in relation to the pitching zone are set for each batter character in order to improve the game element.

Figure 9:
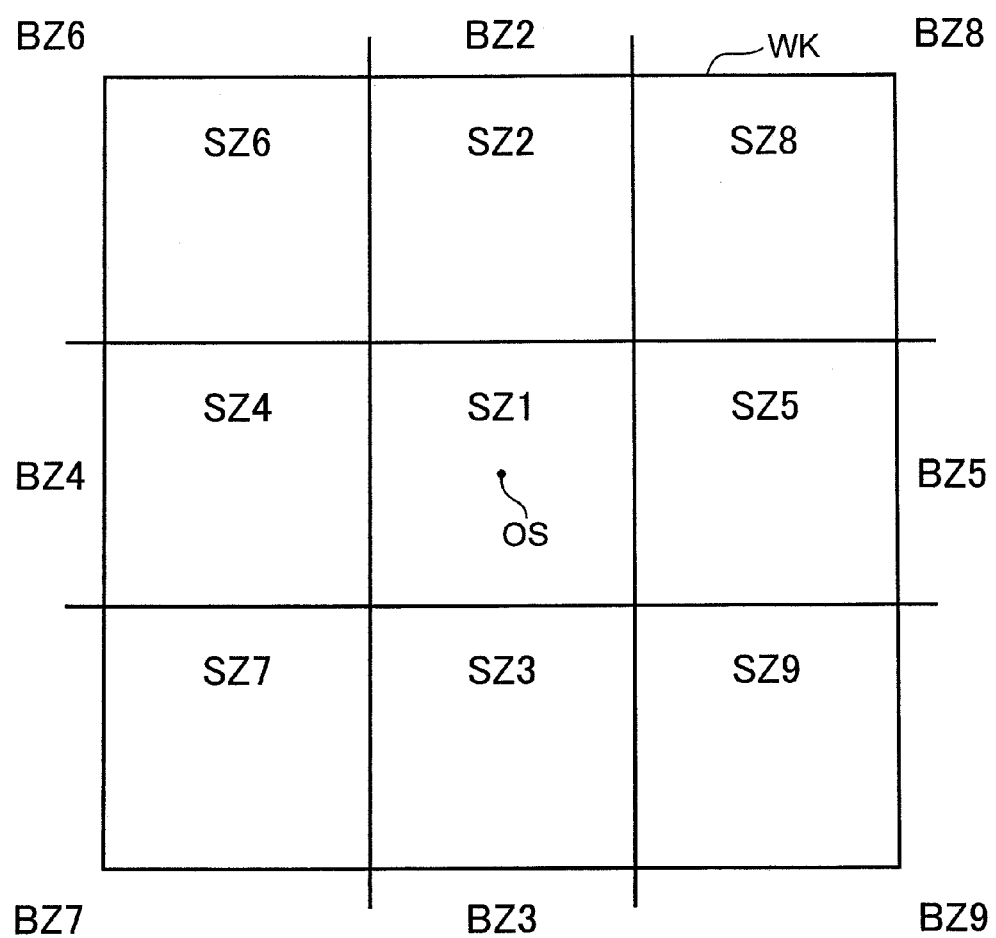
FIG. 9 is an explanatory diagram showing an example of dividing the strike zone into 9 zones for setting the batting characteristic parameter showing the skillfulness and unskillfulness based on the pitching zone.

The batting characteristic parameter setting unit 57 divides, for example, as shown in FIG. 9, the strike zone SZ into nine zones (middle range SZ1, high-and-middle range SZ2, low-and-middle range SZ3, inside-and-middle range SZ4, outside-and-middle range SZ5, high-and-inside range SZ6, low-and-inside range SZ7, high-and-outside range SZ8, low-and-outside range SZ9), and sets the batting characteristic parameter showing the skillfulness and unskillfulness regarding the respective ranges SZ1 to SZ9 to the respective batter characters. Here, it is desirable to also set the batting characteristic parameter regarding the ranges BZ2 to BZ9 of the ball zone BZ adjacent to the respective ranges SZ2 to SZ9 of the strike zone SZ. As examples of the batting characteristic parameter, it may be a parameter having a two-level value of skillful and unskillful, a parameter having a three-level value of skillful, normal and unskillful, or a parameter having a value of four levels or more. Here, although an example of dividing the range for setting the skillfulness and unskillfulness of the pitching zone into nine zones, without limitation thereto, for example, the batting characteristic parameter can also be set to a range that is divided into more zones. The batting characteristic parameter setting unit 57 reads the information concerning the batting characteristic parameter that is stored in advance in the character information storage unit 72 of the data storage unit 44, and sets the batting characteristic parameter to the respective batter characters that are used in the ball game.

The mental parameter setting unit 58 sets, to the respective batter characters, the mental parameter which changes according to the batting average history of the respective batter characters during the game. This is because, in the real world also, for example, when a batter strikes out in three consecutive at-bats, that batter tends to get negative thinking that he/she may not be able to hit the ball in the subsequent at-bats, and often fails to achieve good results in the subsequent at-bats. Thus, in the game also, the evaluation of the mental aspect is reflected in the difficulty of the batting operation by evaluating the mental aspect according to the batting average history during the game and setting the mental parameter to the respective batter characters in order to improve the game element. The mental parameter setting unit 58 considerably reduced the mental parameter as the number of consecutive mishits increases. For example, the mental parameter is exponentially reduced based on the number of consecutive mishits such as reducing the mental parameter by X from the initial value with the first mishit, reducing the mental parameter by X2 from the initial value with two consecutive mishits, and reducing the mental parameter by X3 from the initial value with three consecutive mishits. Moreover, when the player gets a hit at a certain at-bat, the mental parameter is increased by a predetermined value.

The ball-meeting cursor vibration unit 53 displaces and vibrates the ball-meeting cursor K within the first range 31 based on the batter parameter as described above. As the condition for activating the start of vibration of the ball-meeting cursor K, for example, this can be when the condition parameter becomes a predetermined value or lower. Specifically, when the condition parameter decreases to a predetermined value or lower and the batter character's condition becomes bad, the game player can clearly recognize the bad condition of the batter character by causing the ball-meeting cursor K to vibrate within the first range 31. Since the game player can recognize the difficulty of controlling the batter character during the bad condition as described above, the game player can also be motivated to actively substitute the batter character. It is thereby possible to realize a highly amusing baseball game filled with dynamism including the substitution of batter characters rather than playing the game only with fixed players.

Moreover, as another example of the condition for activating the start of vibration of the ball-meeting cursor K, the batting characteristic parameter showing the skillfulness and unskillfulness of the pitching zone can also be used as a reference. Specifically, when the ball-meeting cursor K is positioned in an unskillful zone range (range where the batting characteristic parameter becomes a predetermined value or less), the game player can clearly recognize the difficulty of making contact with the ball in an unskillful zone by causing the ball-meeting cursor K to vibrate within the first range 31.

Moreover, as yet another example of the condition for activating the start of vibration of the ball-meeting cursor K, this can be when the mental parameter becomes a predetermined value or less. Specifically, when the mental parameter decreases to a predetermined value or less as a result of the inferior performance during the game and the weakness of the mental aspect of the batter character appears, the game player can clearly recognize the difficulty of controlling the batter character by causing the ball-meeting cursor K to vibrate within the first range 31.

Moreover, the ball-meeting cursor vibration unit 53 can also comprehensively determine the foregoing condition parameter, batting characteristic parameter and mental parameter, and thereby determine the start of vibration of the ball-meeting cursor K. In addition, it is also possible to determine the start of vibration of the ball-meeting cursor K adding the aspect of the basic capability parameter to each of the foregoing parameters. Specifically, as the basic capability parameter is higher, it is possible to relatively cause the ball-meeting cursor K to not vibrate. For example, when the ball-meeting cursor K is vibrated only when the condition parameter is a predetermined value (threshold) or less, the threshold can be set lower as the basic capability parameter is higher.

The operation of the first range setting unit 51 of setting the size of the first range 31 based on the batter parameters (basic capability parameter, condition parameter, batting characteristic parameter, mental parameter) is now explained. When the size of the first range 31 is "A", the basic capability parameter is "p", the condition parameter is "q", the batting characteristic parameter is "r", and the mental parameter is "s", the size A of the first range 31 that is set by the first range setting unit 51 can be represented as the function of the respective parameters p, q, r, s as:

$$A = f(p,q,r,s) \tag{1}$$

Needless to say, all of these parameters may be used upon determining the size of the first range 31, or arbitrary parameters among the above can be combined. Specifically, it will suffice so as long as at least one of these parameters is used upon determining the size of the first range 31.

Since the first range 31 is set larger as the batter parameter is lower so as to vibrate the ball-meeting cursor K within a broader range and make it difficult to contact the ball object BL, by taking the inverse of the respective parameters p, q, r, s, additionally multiplying coefficients and adjusting the initial value of the size A of the first range 31, the first range 31 can be set larger.

For example, if the initial value of the size A of the first range 31 is A0, the size A of the first range 31 can be computed as:

$$A = f(p,q,r,s) \tag{2}$$
$$= A0 \times (aP/p) \times (aQ/q) \times (aR/r) \times (aS/s)$$

(here, aP, aQ, aR and aS are coefficients).

In the foregoing formula, for example, if only the basic capability parameter p and the condition parameter q are used for setting the size of the first range 31, the terms of (aR/r) and (aS/s) can be deleted to achieve:

$$A = f(p,q) = A0 \times (aP/p) \times (aQ/q) \tag{3}$$

Similarly, the size of the first range 31 can be computed by using at least one batter parameter (basic capability parameter p, condition parameter q, batting characteristic parameter r, mental parameter s) as shown below:

$$A = f(p) = A0 \times (aP/p)$$

$$A = f(q) = A0 \times (aQ/q)$$

$$A = f(r) = A0 \times (aR/r)$$

$$A = f(s) = A0 \times (aS/s)$$

$$A = f(p,r) = A0 \times (aP/p) \times (aR/r)$$

$$A = f(p,s) = A0 \times (aP/p) \times (aS/s)$$

$$A = f(p,q,r) = A0 \times (aP/p) \times (aQ/q) \times (aR/r) \ldots$$

As a specific computing example, when the maximum value of the respective parameters p, q, r, s is 100 and all coefficients are also 100 (that is, aP=aQ=aR aS=100), and the basic capability parameter p of a certain batter character is 100 and the condition parameter q is 80 (state where the condition is 80%), and the batting characteristic parameter r of a certain pitching zone is 90 (unskillful zone), and the mental parameter s is 90 (mentally reduced to 90%), the size A of the first range 31 will be:

$$A = A0 \times (100/100) \times (100/80) \times (100/90) \times (100/90) = A0 \times 1.54,$$

and the size can be set to 1.54 times the initial value A0 of the first range 31.

Note that, since the size of the first range 31 is proportional to the range of oscillation of the ball-meeting cursor K, the size A of the first range 31 can also be set as the range of oscillation of the ball-meeting cursor K.

Another example of determining the size of the first range 31 based on the batter parameter (basic capability parameter, condition parameter, batting characteristic parameter, mental parameter) is now explained. In the foregoing example, a case was explained where the size of the first range 31 was determined without setting a priority to the respective parameters, but the size of the first range 31 can also be determined by setting a priority to the respective parameters as shown below.

Foremost, the size of the first range 31 based on the basic capability parameter p of the batter character is used as the base. Since the first range 31 is set larger as the basic capability parameter p is lower so as to vibrate the ball-meeting cursor K within a broader range and make it difficult to contact the ball object BL, by taking the inverse of the basic capability parameter p, additionally multiplying the coefficient aP and making adjustments, the size of the base of the first range 31 can be determined.

Specifically, the base size ABASE of the first range 31 can be computed as:

$$ABASE = aP/p \tag{4}$$

Subsequently, the weight of the condition parameter q is multiplied to the base size ABASE of the first range 31. Here, since the first range 31 can be set larger as the condition parameter q is lower, the size A of the first range 31 can be computed as:

$$A = ABASE \times (aQ/q) \quad (5) \text{ (here, } aQ \text{ is a coefficient)}.$$

For example, when the maximum of the condition parameter q (state where the condition is a normal condition or higher) is 100, it will be q=90 when the condition is a state of 90% and will be q=80 when the condition is a state of 80%. When the coefficient aQ is 100 and the condition is a state of 90% (q=90), the size A of the first range 31 will be:

$$A = ABASE \times (100/90),$$

and the base size ABASE that is determined based on the basic capability parameter p will be 100/90=1.11 times.

Subsequently, the weight value (aQ/q) that was determined by the condition parameter q is adjusted by the batting characteristic parameter r regarding the skillfulness and unskillfulness of the batter character in relation to the pitching zone. For example, the size A of the first range 31 can be computed as:

$$A = ABASE \times \{aQ/(q+r)\} \quad (6) \text{ (here, aQ is a coefficient)}.$$

For example, the batting characteristic parameter r can be set as r=+5 in a skillful zone and set as r=−5 in an unskillful zone. As an example, when the condition is in a state of 90% (q=90) in an unskillful zone (r=−5), the size A of the first range 31 will be:

$$A = ABASE \times \{100/(90-5)\} = ABASE \times (100/85),$$

and the base size ABASE that is determined based on the basic capability parameter p will be 100/85=1.18 times.

In addition, the weight value {aQ/(q+r)} that was determined by the condition parameter q and the batting characteristic parameter r is adjusted with the mental parameter s. For example, the size A of the first range 31 can be computed as:

$$A = ABASE \times [aQ/\{(q+r) \times (s/aS)\}] \quad (7) \text{ (here, aQ and aS are coefficients)}.$$

For example, when the maximum of the mental parameter s is 100, it will be s=90 when mentally reduced to 90%, and will be s=80 in a state of 80%. When the coefficient aS is 100 and mentally reduced to 80% (s=80), the size A of the first range 31 will be:

$$A = ABASE \times [100/\{(90-5) \times (80/100)\}]$$
$$= ABASE \times (100/68),$$

and the base size ABASE that is determined by the basic capability parameter p will be 100/68=1.47 times.

In this example, the base size ABASE is determined based on the basic capability parameter p, and the weight to be multiplied to the ABASE is determined by applying priority in the order of condition parameter q, batting characteristic parameter r, and mental parameter s. In this example, the basic capability parameter p for determining the base size ABASE is essential. Meanwhile, the condition parameter q, the batting characteristic parameter r, and the mental parameter s for determining the weight are not all required, and, as shown in foregoing formula (5), the weight may be determined only based on the condition parameter q with the highest priority. Otherwise, as shown in foregoing formula (6), the weight may be determined based on the condition parameter q and the batting characteristic parameter r. Otherwise, as shown in formula (8) below, a variation of determining the weight based on the parameter q and the mental parameter s can also be considered.

$$A = ABASE \times [aQ/\{q \times (s/aS)\}] \quad (8) \text{ (here, aQ and aS are coefficients)}.$$

Moreover, when the ball-meeting cursor vibration unit 53 is to perform control using the second range 32, it causes the ball-meeting cursor K to vibrate within the first range 31 only when the ball-meeting cursor K is positioned outside the second range 32.

Figure 10:
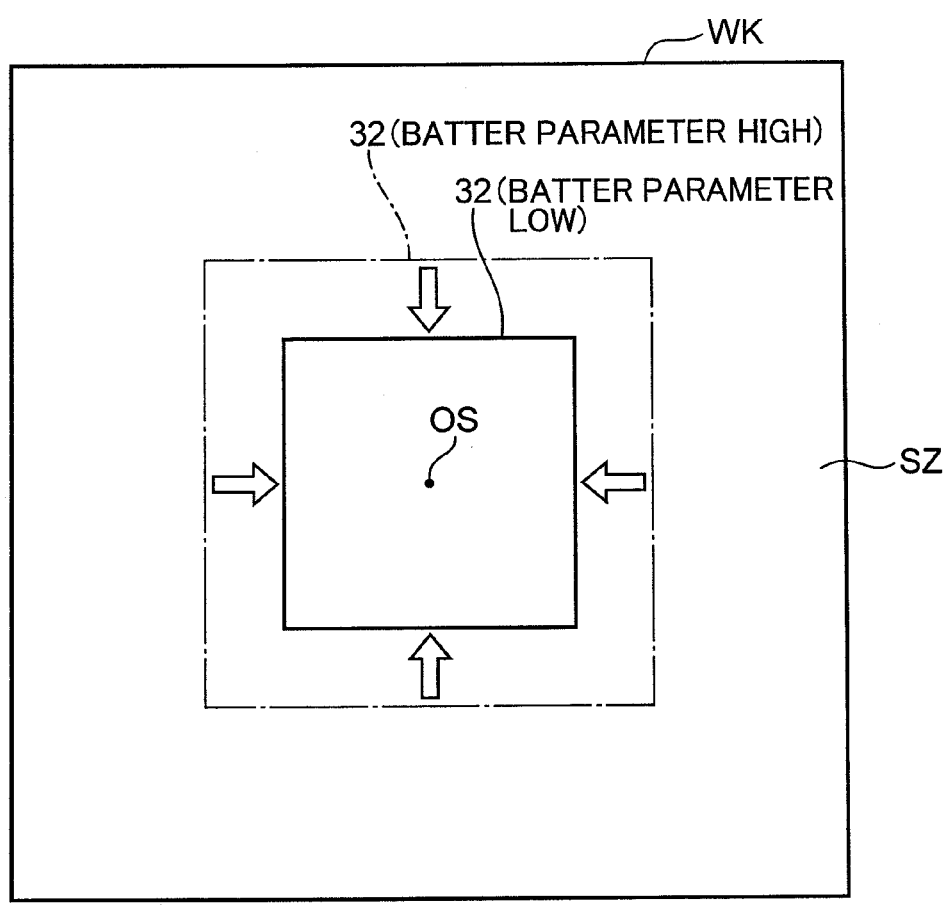
FIG. 10 is an explanatory diagram explaining the area change of the second range according to the batter parameter.

In addition, as shown in FIG. 10, the second range setting unit 52 desirably sets the area of the second range 32, which is set at the center of the strike zone SZ as a range where the ball-meeting cursor K is not vibrated, to be smaller as the batter parameter is lower. Specifically, in the real world also, when the player's basic capability is relatively low or that player's condition is bad, the range where the player will not mishit an easy ball that is pitched near the middle of the strike zone will also be narrowed. Thus, the same circumstances are also reflected in the game in order to create a realistic feeling. Consequently, since the area of the second range 32 will be smaller as the batter parameter is lower, and the range where the ball-meeting cursor K is vibrated causing the batting operation to be difficult will be broadened, the game player can clearly realize the difficulty of controlling the batter character.

The operation of the second range setting unit 52 which sets the size of the second range 32 based on the batter parameters (basic capability parameter, condition parameter, batting characteristic parameter, mental parameter) is now explained.

When the size of the second range 32 is "B", the basic capability parameter is "p", the condition parameter is "q", the batting characteristic parameter is "r", and the mental parameter is "s", the size B of the second range 32 that is set by the second range setting unit 52 can be represented as the function of the respective parameters p, q, r, s as:

$$B = f(p, q, r, s) \quad (9).$$

Needless to say, all of these parameters may be used upon determining the size of the second range 32, or arbitrary parameters among the above can be combined. Specifically, it will suffice so as long as at least one of these parameters is used upon determining the size of the second range 32.

Since the area of the second range 32 is set smaller as the batter parameter is lower, if the initial value of the size 13 of the second range 32 is B0, the size B of the second range 32 can be computed as:

$$B = f(p, q, r, s) \quad (10)$$
$$= B0 \times aPp \times aQq \times aRr \times aSs$$

(here, aP, aQ, aR and aS are coefficients).

In the foregoing formula, for example, if only the basic capability parameter p and the condition parameter q are used for setting the size of the second range 32, the terms of aRr and aSs can be deleted to achieve:

$$B = f(p,q) = B0 \times aPp \times aQq \quad (11).$$

Similarly, the size of the second range 32 can be computed by using at least one batter parameter (basic capability parameter p, condition parameter q, batting characteristic parameter r, mental parameter s) as shown below:

$$B = f(p) = B0 \times aPp$$

$$B = f(q) = B0 \times aQq$$

$$B = f(r) = B0 \times aRr$$

$$B = f(s) = B0 \times aSs$$

$$B = f(p,r) = B0 \times aPp \times aRr$$

$$B = f(p,s) = B0 \times aPp \times aSs$$

$$B = f(p,q,r) = B0 \times aPp \times aQq \times aRr \ldots$$

As a specific computing example, when the maximum value of the respective parameters p, q, r, s is 100 and all coefficients are also 0.01 (that is, aP=aQ=aR=aS=0.01), and the basic capability parameter p of a certain batter character is 100 and the condition parameter q is 80 (state where the condition is 80%), and the batting characteristic parameter r of a certain pitching zone is 90 (unskillful zone), and the mental parameter s is 90 (mentally reduced to 90%), the size B of the second range 32 will be:

$$B = B0 \times 0.01 \times 100 \times 0.01 \times 80 \times 0.01 \times 90 \times 0.01 \times 90$$
$$= B0 \times 0.65,$$

and the size can be set to 0.65 times the initial value B0 of the second range 32.

Moreover, the ball-meeting cursor vibration unit 53 can change the displacement speed of the ball-meeting cursor K to vibrate within the first range 31 by using at least one batter parameter (basic capability parameter p, condition parameter q, batting characteristic parameter r, mental parameter s). It will become more difficult for the game player to predict the movement of the ball-meeting cursor K as the speed of the ball-meeting cursor K to vibrate within the first range 31 becomes faster, and more difficult to make contact with the ball object BL using the ball-meeting cursor K. Thus, desirably, the ball-meeting cursor vibration unit 53 enables the game player to realize the difficulty in controlling the batter character by increasing the speed of the ball-meeting cursor K to vibrate within the first range 31 as the batter parameter is lower.

Figure 11:
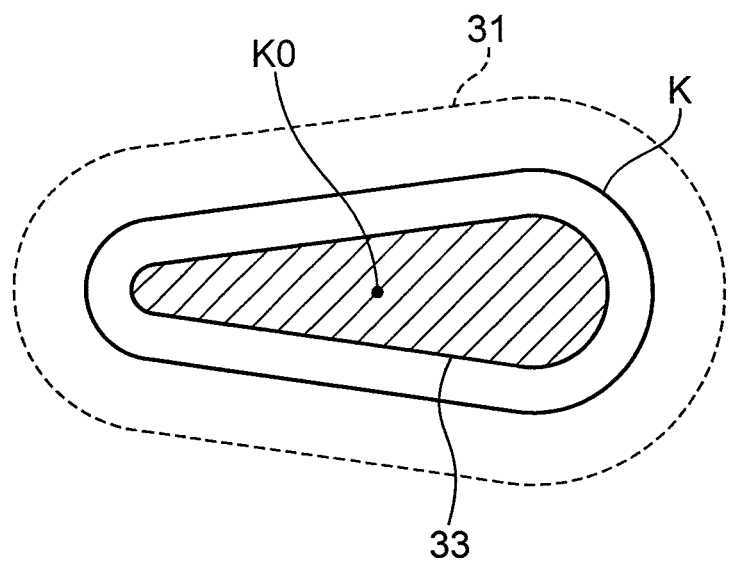
FIG. 11 is an explanatory diagram explaining the speed change of the ball-meeting cursor which vibrates within the first range.

Moreover, as shown in FIG. 11, desirably, the ball-meeting cursor vibration unit 53 causes the speed of the ball-meeting cursor K that passes through the center-side range 33 of the first range 31 to be faster than the speed of the ball-meeting cursor K that passes through a range other than the center-side range 33. Here, the ball-meeting cursor K passing through the center-side range 33 of the first range 31 means that the center K0 of the ball-meeting cursor K passes through the center-side range 33. When the ball-meeting cursor K is vibrating within the first range 31, the mindset of a general game player will be to contact the ball object BL with a position near the center of the vibrating range as the target. Thus, as a result of increasing the speed of the ball-meeting cursor K that passes through the center-side range 33 of the first range 31 near the center of the vibrating range to be faster than the other ranges, it will become more difficult to make contact with the ball object BL using the ball-meeting cursor K, and the game player can further realize the difficulty of controlling the batter character.

Moreover, the ball-meeting cursor vibration unit 53 causes the ball-meeting cursor K to move randomly vertically and horizontally without providing any regularity in the position change of the ball-meeting cursor K that is vibrating within the first range 31. When the ball-meeting cursor vibration unit 53 is to determine the coordinate position of the advancing direction of the ball-meeting cursor K that is vibrating within the first range 31, it generates a random number and determines the advancing direction based on such random number so as to avoid any regularity in the vibration of the ball-meeting cursor K within the first range 31. Consequently, it becomes more difficult to predict the movement of the ball-meeting cursor K, and more difficult to make contact with the ball object BL with the ball-meeting cursor K.

The game progress control unit 61 is used for advancing the baseball game. With this baseball game, it is possible to play a baseball game in a versus mode where game player A and game player B compete for a high score by alternating offense and defense upon applying the standard rules of a baseball game, and it is also possible to play a baseball game in a CPU mode where one game player plays the baseball game under the automatic control of the CPU based on an AI program (Artificial Intelligence Program). To illustrate a CPU mode, when the game player is playing offense, the game progress control unit 61 causes the pitcher character CR2 displayed on the display unit 42 to engage in a pitching operation at a predetermined timing, sets the trajectory of the ball object BL, and displays the moving ball object BL on the display unit 42 according to the set trajectory.

Moreover, when the game player is playing defense, the game progress control unit 61 causes the pitcher character CR2 displayed on the display unit 42 to engage in a pitching operation when a pitching start command is input to the operation unit 41 from the game player, sets the trajectory of the ball object BL according to a zone setting command that was input by the game player, and displays the moving ball object on the display unit 42 according to the set trajectory.

Figure 4:
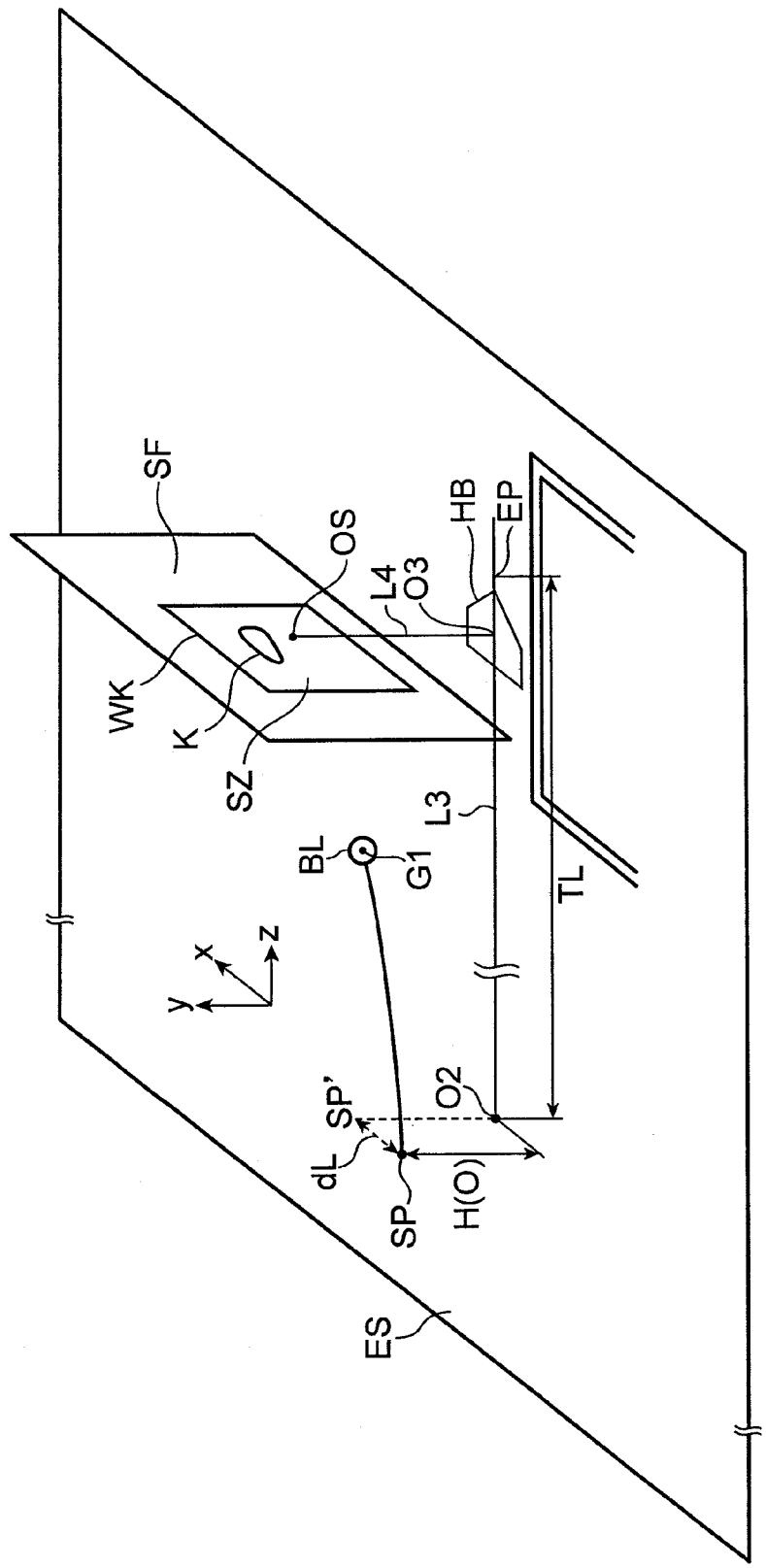
FIG. 4 is an explanatory diagram showing a virtual three-dimensional space where the baseball game is carried out by the game device of an embodiment of the present invention.

FIG. 4 is a diagram showing the virtual three-dimensional space (game space) where the baseball game is carried out by the game device of an embodiment of the present invention, Note that z shown in FIG. 4 represents a direction that is parallel to the straight line L3 that connects the center O2 of the pitcher's mound and the center O3 of the home base HB in the virtual three-dimensional space, and shows the advancing direction of the ball object BL. Moreover, y shows the vertical direction, and x shows the direction that is orthogonal to the vertical direction and the advancing direction. Here, the x-z plane is parallel to the ground level ES, and the x-coordinate and the z-coordinate define the respective positions of the ground level ES. Moreover, the vertical direction is a direction that is orthogonal to the ground level ES. In this embodiment, y increases as it is distanced from the ground level ES. Moreover, z increases as it heads toward the center O3 of the home base HB from the center O2 of the pitcher's mound. Moreover, when viewing x from a +z direction, for example, the left side is + and the right side is −. Moreover, let it be assumed that the origin of the x, y, z-axis is the center O2.

The strike zone SZ, for example, passes through the center O3 and is set on the movable range SF as a plane that is parallel to the x-y plane, is a square range that is surrounded by the outline box WK, and is set in the game space based on the actual strike zone of a baseball game.

The center OS of the strike zone SZ is positioned a predetermined distance away from the center O3 in the +y direction, and corresponds to the dead center of the strike zone.

The ball-meeting cursor K moves on the movable range SF according to the move command that is input to the operation unit 41. However, this is merely an example, and the ball-meeting cursor K can also be moved on a plane that is displaced slightly from the movable range SF in the z direction.

Moreover, the size of the movable range SF may be a size that is slightly larger than the size of the strike zone SZ. The pitcher character CR2 and the batter character CR1 shown in FIG. 3 are disposed in the ground level ES. Moreover, a catcher character and an umpire character are disposed on the +z side from the home base HB.

If the pitcher character CR2 is right handed, for example, the point SP that is separated a distance dL in the −x direction from the point SP' that is separated by H (O) from the center O2 in the y direction will become the release point of the ball object BL by the pitcher character CR2.

Returning to FIG. 2, the batting determination unit 62 determines the timing of hitting the ball object BL by the batter character according to the batting input signal that is output from the operation unit 41 as a result of a batting command for causing the batter character to hit the ball object BL being input by the game player, and determines that the batter character was able to hit the ball object BL when the ball object BL overlaps with the ball-meeting cursor K at the determined batting timing.

FIG. 5 is a diagram which views the virtual three-dimensional space shown in FIG. 4 from the x-axis direction. The batting determination unit 62, as shown in FIG. 5, determines, as the batting time, the lapse of a predetermined time from the time that the batting command was input to the operation unit 41 to the time required for the batter character to swing the bat object and the bat object reaching the movable range SF. The batting determination unit 62 determines that the ball object BL was hit by the batter character when the ball object BL and the ball-meeting cursor K overlap at the batting timing.

Nevertheless, there is a possibility that the game will become too difficult and deteriorate the amusement of the game. Thus, in this embodiment, for example, it is also possible to determine that the ball object BL and the ball-meeting cursor K have overlapped at the batting timing when the z component of the ball object 13L exists between a position that is separated by a distance d1 in the −z direction relative to the movable range SF and a position that is separated by a distance d2 in the +z direction relative to the movable range SF, and the extended line of the ball object BL at such time intersects with the ball-meeting cursor K on the movable range SF.

Here, as the extended line of the ball object BL, for example, used may be a straight line that is extended in the direction of the speed of the ball object BL when the batting timing was determined with the center of gravity G1 of the ball object BL as the origin.

Otherwise, when the z component of the ball object BL exists between a position that is separated by a distance d1 relative to the movable range SF and a position that is separated by a distance d2 relative to the movable range SF at the batting timing, it is also possible to set a movable range SF' that passes through the center of gravity G1 at such time and is parallel to the movable range SF, project the ball-meeting cursor K on the movable range SF on the set movable range SF', and determine that the ball object BL and the ball-meeting cursor K have overlapped when the projected ball-meeting cursor K and the ball object BL overlap.

Note that, as d1 and d2, the same distance as the length of the z component of the strike zone from the movable range SF, or the distance obtained by adding or subtracting a slight margin can be used.

Returning to FIG. 2, the batting power setting unit 63 sets the batting power for hitting the ball object BL when the batting determination unit 62 determines that the ball object 13L and the ball-meeting cursor K overlapped at the batting timing.

Here, the batting power setting unit 63 sets the batting power to be greater as the passing position of the ball-meeting cursor K of the center of gravity G1 of the ball object BL is closer to the center of gravity of the ball-meeting cursor K at the batting timing. In this embodiment, the initial velocity V0 of the ball object BL can be used as the batting power, and the batting determination unit 62 obtains the initial velocity V0 of the ball object BL by correcting the predetermined size of the reference initial velocity Vref and direction of the ball object BL.

Figure 6A:
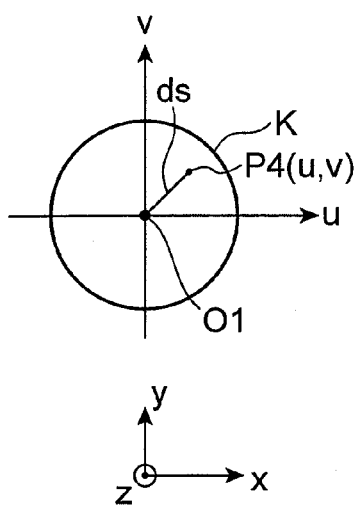
FIGS. 6A to 6C are explanatory diagrams explaining the calculation processing of the initial velocity of the ball object that was batted.
Figure 6B:
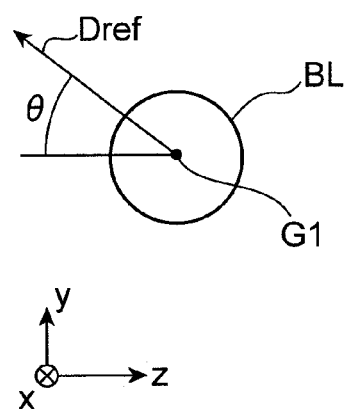
Figure 6C:
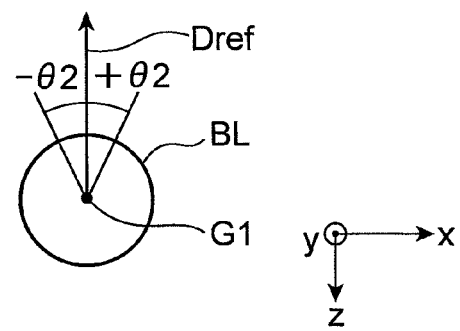

FIGS. 6A to 6C are diagrams showing the calculating processing of the initial velocity V0 of the ball object BL that was hit. As shown in FIG. 6A, let it be assumed that the center of gravity of the range where the ball object BL and the ball-meeting cursor K overlapped was the point P4 (u, v). However, u is a coordinate axis that passes through the center O1 of the ball-meeting cursor K and is parallel to the x-axis, and v is a coordinate axis that passes through the center O1 and is parallel to the y-axis.

In the foregoing case, the batting power setting unit 63 obtains the distance ds between the point P4 and the center O1, obtains the correction factor $\beta$ for setting the reference initial velocity Vref smaller as the distance ds increases, corrects the size of the reference initial velocity Vref by multiplying the correction factor $\beta$ to the reference initial velocity Vref ($\beta \cdot$Vref), and sets the size of the corrected reference initial velocity Vref as the size of the initial velocity V0 of the ball object BL.

Note that the batting power setting unit 63 can calculate the correction factor by using a predetermined function in which the correction factor $\beta$ increases as the distance ds is reduced with the correction factor $\beta$ as the output and the distance ds as the input.

The method of calculating the direction of the initial velocity V0 of the ball object BL by the batting power setting unit 63 is now explained with reference to FIGS. 6A to 6C. The batting power setting unit 63 corrects the pitch angle $\theta$ of a predetermined reference direction Dref showing the direction of the reference initial velocity Vref as shown in FIG. 6B according to the value of v of the point P4 shown in FIG. 6A, and sets the pitch angle $\theta$ of the corrected reference direction Dref as the pitch angle of the initial velocity V0.

Specifically, the batting power setting unit 63 determines that the correction amount of the reference direction Dref is 0 when the v of the point P4 is positioned on the u-axis, rotates the pitch angle $\theta$ of the reference direction Dref at a predetermined angle in the clockwise direction according to the value of v of the point P4 when v of the point P4 is a positive value, and rotates the pitch angle $\theta$ of the reference direction Dref at a predetermined angle in the counterclockwise direction according to the value of v of the point P4 when v of the point P4 is a negative value.

Note that the pitch angle $\theta$ of the reference initial velocity Vref is set in a clockwise direction with the z-axis as the reference.

Moreover, when u of the point P4 is a positive value, the batting power setting unit 63 rotates the yaw angle $\theta 2$ of the reference direction Dref, as shown in FIG. 6C, at a predetermined angle in the clockwise direction (+$\theta 2$ side) with the z-axis as the reference according to the value of u of the point P4, and sets the rotated yaw angle $\theta 2$ of the reference direction Dref as the yaw angle of the initial velocity V0. Meanwhile, when u of the point P4 is a negative value, the batting power setting unit 63 rotates the yaw angle $\theta 2$ of the reference direction Dref at a predetermined angle in the counterclockwise direction (−$\theta 2$ side) with the z-axis as the reference according to the value of u of the point P4, and sets the rotated yaw angle θ2 of the reference direction Dref as the yaw angle of the initial velocity V0.

Moreover, when the batting power setting unit 63 that contact was made even though the center of gravity G1 of the ball object BL is displaced from the movable range SF in the z direction at the batting timing as shown in FIG. 5, it rotates the yaw angle θ2 of the reference direction Dref shown in FIG. 6C according to such displacement.

Specifically, when the batter character is a right-handed batter and the center of gravity G1 of the ball object BL is positioned on the −z direction side from the movable range SF in FIG. 5, it is determined that the batter character swung early. Then, the yaw angle θ2 shown in FIG. 6C is rotated a predetermined angle in the counterclockwise direction with the z-axis as the reference according to the distance d between the center of gravity G1 of the ball object BL and the movable range SF.

Meanwhile, when the batter character is a right-handed batter and the center of gravity G1 of the ball object BL is positioned on the +z direction side from the movable range SF, it is determined that the batter character swung late. Then, the yaw angle θ2 shown in FIG. 6C is rotated a predetermined angle in the clockwise direction with the z-axis as the reference according to the distance d.

Note that when the batter character is a left-handed batter and such batter swung early, the yaw angle θ2 shown in FIG. 6C is rotated at a predetermined angle in the clockwise direction according to the distance d, and if such batter swung late, the yaw angle θ2 is rotated at a predetermined angle in the counterclockwise direction according to the distance d.

Returning to FIG. 2, the data storage unit 44 is configured, for example, from a main memory 5, and functions as the image storage unit 71, the character information storage unit 72 and the batting average history storage unit 73.

The image storage unit 71 is used for storing the image data that is required upon realizing the baseball game, and, for example, stores the image data of fielding characters, batter character, bat object, background image of the baseball field, pitcher character and the like. Here, as the image data of the background image of the baseball field, for example, image data that is prepared in advance by projecting a virtual three-dimensional model that is prepared in advance from a predetermined viewpoint within the virtual three-dimensional space.

The character information storage unit 72 stores the attribute information of the respective characters including information concerning the basic capability parameter, and the basic capability parameter setting unit 55 reads such information and sets the basic capability parameter to the respective batter characters that are used in the ball game.

The batting average history storage unit 73 stores the battering average history of the respective batter characters during the game for each at-bat. Specifically, the batting average history storage unit 73 stores, for each at-bat of each batter character, the batting result of a hit (single, double, triple, homerun), bases on balls plus hit batsmen, or out (mishit, strikeout). The mental parameter setting unit 58 reads the information of the batting average history of the respective batter characters stored in the batting average history storage unit 73, and sets the mental parameter to the respective batter characters.

Moreover, the batting average history storage unit 73 can also store the fielding history (big play or error) concerning the fielding of the respective batter characters during the game in addition to the batting average history concerning batting. Thus, the mental parameter setting unit 58 can also set the mental parameter according to the batting average history or the fielding history. In other words, when a player makes an error during fielding, it may have an adverse effect on the mental aspect and lead to a batting slump. Thus, the fielding history concerning fielding can also be included in the setting of the mental parameter.

The program storage unit 45 is configured, for example, from a recording medium drive 17 or the like, and includes a computer-readable recording medium 81. The recording medium 81 is configured from a recording medium 300, and stores the game control program of the present invention. Note that, when the game control program is read from the recording medium 300 and the game control program is recorded in the main memory 5, the main memory 5 functions as the program storage unit 45.

Figure 12:
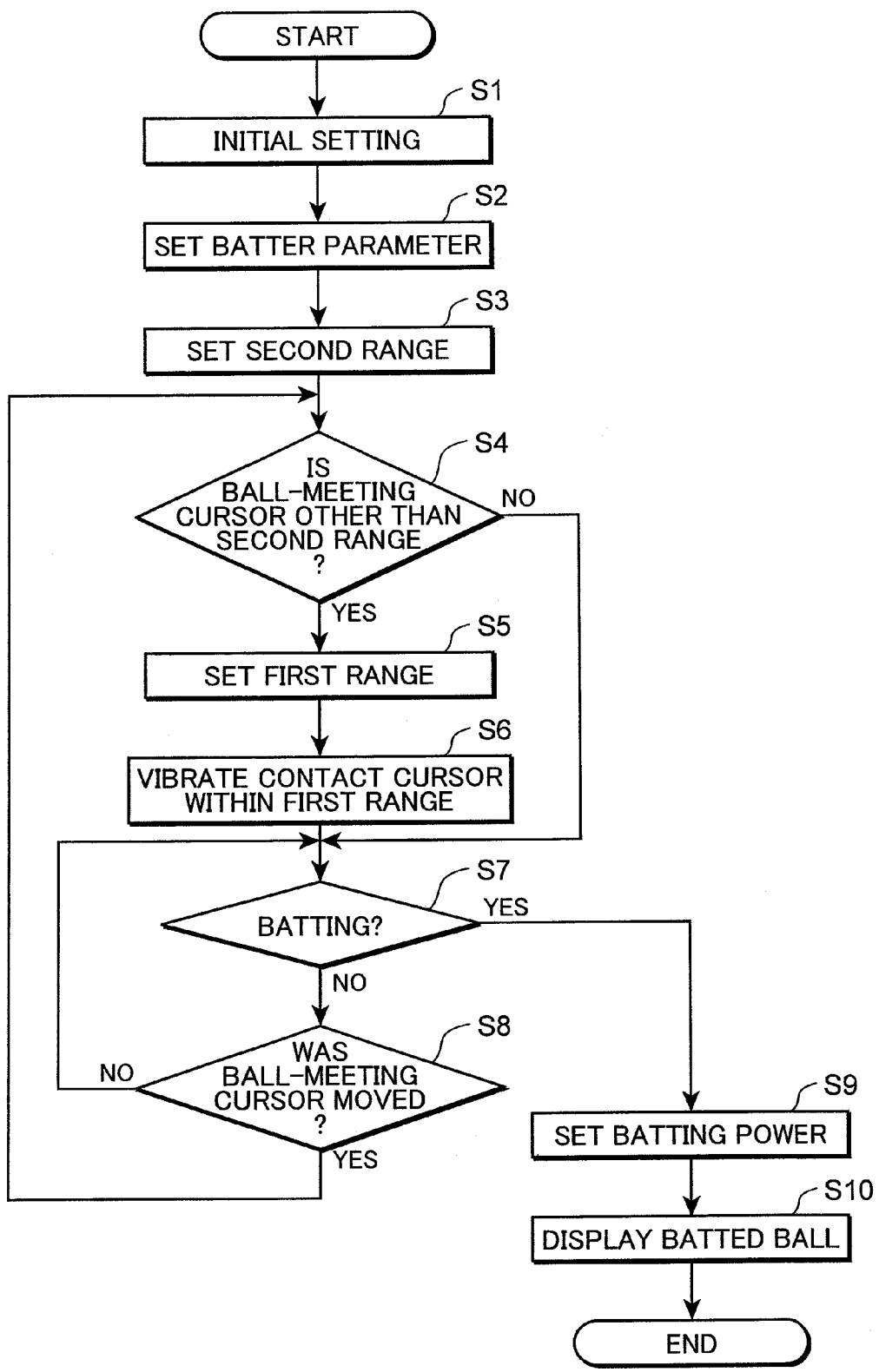
FIG. 12 is a flowchart showing an operational example of the game device according to an embodiment of the present invention.

In the foregoing configuration, an operational example of the game device according to an embodiment of the present invention is now explained with reference to the flowchart of FIG. 12.

Foremost, the game progress control unit 61 reads image data such as the batter character CR1, the bat object BT, the background image of the baseball field, the pitcher character CR2, and the fielder character from the image storage unit 71 and displays these on the display unit 42, and performs the initial setting (S1). In the foregoing case, for example, the image as shown in FIG. 3 is displayed on the display unit 42.

Subsequently, the batter parameter setting unit 54 sets the batter parameter (basic capability parameter, condition parameter, batting characteristic parameter, mental parameter and the like) to the batter character standing in the batter's box (S2). Here, it will suffice so as long as at least one parameter among the plurality of batter parameters is set to the batter character.

For example, the mental parameter changes according to the batting average history of the batter character during the game, and it does not mean much at the beginning of the game, and takes on greater meaning at the later part of the game. Thus, the mental parameter can be applied from a predetermined at-bat onward (for example, from the third at-bat onward) of the respective batter characters.

When the condition parameter has been set to the batter character standing in the batter's box, it is possible to allow the game player to learn of the good/bad condition of that batter player by differing the expression or color of the batter character's face according to the condition parameter. For example, based on a display presentation, for example, where the batter character smiles in a good condition and frowns in a bad condition, the game player can assume the current condition of the batter character when the batter character steps into the batter's box.

Subsequently, as shown in FIG. 8, the second range setting unit 52 sets the second range 32 including the center OS of the strike zone SZ within the outline box WK of the strike zone SZ (S3). Here, as shown in FIG. 10, since the second range setting unit 52 reduces the range where the ball-meeting cursor K is not vibrated (that is, expands the range of vibrating the ball-meeting cursor K) as the batter parameter of the batter character is lower, it is desirable that the area of the second range 32 is set small.

When the center coordinates of the ball-meeting cursor K exist outside the second range 32 set as described above (S4: YES), the first range setting unit 51 sets the first range 31 where the ball-meeting cursor K is positioned at the center (S5), and the ball-meeting cursor vibration unit 53 vibrates the ball-meeting cursor K within the set first range 31 (S6).

Here, desirably, the first range setting unit 51 sets the area of the first range 31 larger as the batter parameter of the batter character is lower so as to expand the range of oscillation of the ball-meeting cursor K and make it more difficult for the game player to make contact with the ball object BL using the ball-meeting cursor K. In addition, as shown in FIG. 7, desirably, the first range setting unit 51 sets the first range 31 larger as the ball-meeting cursor K is positioned more outward from the center OS of the strike zone SZ so as to make it more difficult for the game player to make contact with the ball object BL using the ball-meeting cursor K. In addition, desirably, the ball-meeting cursor vibration unit 53 causes the speed of the ball-meeting cursor K that passes through the center-side range 33 of the first range 31 shown in FIG. 11 to be faster than the speed of the ball-meeting cursor K that passes through a range other than the center-side range 33 so as to make it more difficult for the game player to make contact with the ball object BL using the ball-meeting cursor K.

Meanwhile, when the center coordinates of the ball-meeting cursor K exist inside the second range 32 (S4: NO), the ball-meeting cursor vibration unit 53 does not vibrate the ball-meeting cursor K in order to reflect the state where not many mishits occur in the pitching zone near the middle of the strike zone SZ.

When the game player performs the operation of moving the ball-meeting cursor K before performing the batting command operation (S7: N0, S8: YES), the routine proceeds to foregoing S4 to determine whether the ball-meeting cursor K is positioned inside or outside the second range 32, the vibration of the ball-meeting cursor K is stopped if on the inside and the ball-meeting cursor K is vibrated if on the outside, and this routine of S4 to S8 is repeated based on loop processing.

When the game player performs the batting command operation, the batting determination unit 62 determines whether the batter character was able to hit the ball object BL as described above (S7). When it is determined that the batter character was able to hit the ball object BL (S7: YES), the batting power setting unit 63 sets the batting power of the ball object BL as described above (S9). Subsequently, the game progress control unit 61 sets the trajectory of the ball object BL according to the batting power of the ball object BL that was set by the batting power setting unit 63, and displays the moving ball object BL on the display unit 42 according to the set trajectory (S10). Here, for example, the game progress control unit 61 can determine the trajectory of the ball object by correcting the trajectory to become the reference of the ball object BL according to the size of the initial velocity V0 and direction of the ball object BL as the batting power. Note that the operational example of the flowchart shown in FIG. 12 is based on a premise of setting the second range 32 in the strike zone SZ where the ball-meeting cursor K is not vibrated, but a configuration of omitting S4 and S5 of FIG. 12 and causing the ball-meeting cursor K to vibrate within the entire movable range of the ball-meeting cursor K without setting the second range 32 can also be adopted. Here, by applying the technology of setting the first range 31 relatively small where the ball-meeting cursor K is positioned near the center OS of the strike zone SZ so that the vibration range of the ball-meeting cursor K does not become too great, and setting the first range 31 larger as the ball-meeting cursor K is positioned more outside from the center OS of the strike zone SZ, it is possible to reflect the realistic feeling where mishits do not occur frequently in the pitching zone near the middle of the strike zone SZ, and mishits tend to occur frequently in the difficult-to-hit pitching zone that is away from the middle of the strike zone SZ.

Another operational example of the game device according to an embodiment of the present invention is now explained with reference to the flowchart of FIG. 13.

Figure 13:
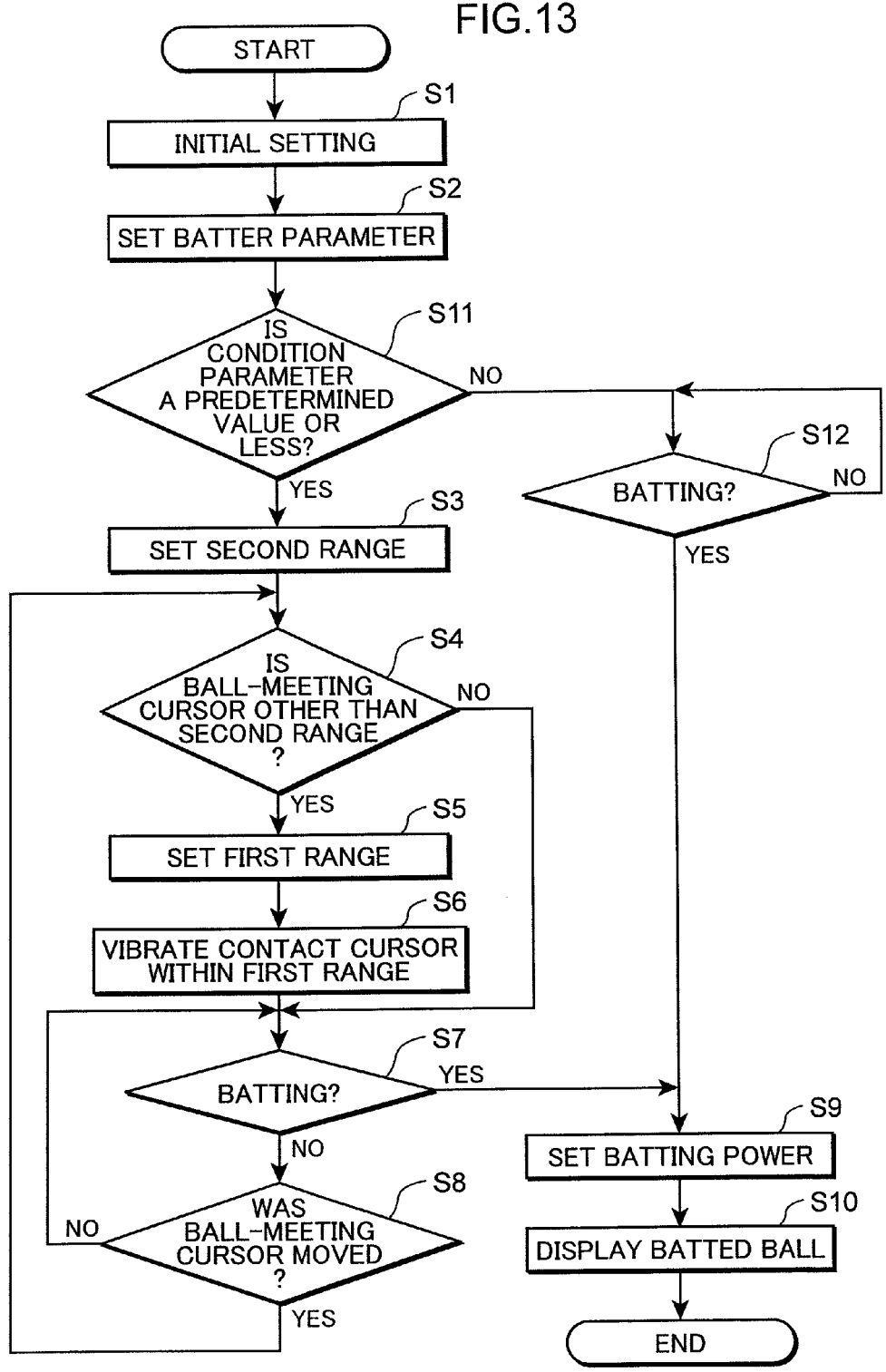
FIG. 13 is a flowchart showing another operational example of the game device according to an embodiment of the present invention.

The flowchart shown in FIG. 13 is an operational example where the ball-meeting cursor vibration unit 53 causes the ball-meeting cursor K to vibrate only when the condition parameter is a predetermined value or less. Specifically, after foregoing S2 (batter parameter setting processing), it is determined whether the condition parameter is a predetermined value or less (S11), and, when the condition parameter is a predetermined value or less (S11: YES), the routine proceeds to foregoing S3, and performs foregoing S3 to S10. Meanwhile, when the condition parameter is higher than a predetermined value (S11: NO), the proceeds to S12 without the ball-meeting cursor vibration unit 53 vibrating the ball-meeting cursor K, and whether the batter character was able to hit the ball object BL is determined.

As a result of causing the ball-meeting cursor K to vibrate with the condition parameter being a predetermined value or less (that is, bad condition of the batter character) as the trigger, since the game player can recognize the difficulty of controlling the batter character during a bad condition, the game player can also be motivated to actively substitute the batter character that is difficult to control as a result of its batter parameter being decreased. It is thereby possible to realize a highly amusing baseball game filled with dynamism including the substitution of batter characters rather than playing the game only with fixed players.

Note that, as the condition for activating the start of vibration of the ball-meeting cursor K, for example, there is also a variation of the mental parameter being a predetermined value or less as described above. Specifically, the condition of causing the ball-meeting cursor K to vibrate can also be satisfied when at least one batter parameter (basic capability parameter, condition parameter, batting characteristic parameter, mental parameter) becomes a predetermined value or less in relation to the condition of activating the start of vibration of the ball-meeting cursor K.

As explained above, according to the present game device, high-low change of the batter parameter (basic capability parameter, condition parameter, batting characteristic parameter, mental parameter) of the batter character can be accurately reflected as the difficulty of the actual batting operation by the game player based on an amusing presentation of vibrating the ball-meeting cursor K, which was not available conventionally, and the difficulty setting of the batting operation of the game player can be effectively performed according to the contents of the batter parameter. Consequently, since the game player can recognize the difficulty of controlling the batter character, the game player can also be motivated to actively substitute the batter character that is difficult to control as a result of its batter parameter being decreased. It is thereby possible to realize a highly amusing baseball game filled with dynamism including the substitution of batter characters rather than playing the game only with fixed players.

The technical features of the foregoing game device can be summarized as follows.

(1) The game device according to one aspect of the present invention is a game device which executes a baseball game in which a batter character hits a ball object that is pitched by a pitcher character, comprising a ball-meeting cursor position control unit which controls positioning of a ball-meeting cursor, in a game space, showing a range where the batter character can hit the ball object according to an operation of a game player, a batter parameter setting unit which sets a batter parameter of the batter character in relation to batting of that batter character, a first range setting unit which sets a first range where the ball-meeting cursor is positioned at the center, and a ball-meeting cursor vibration unit which displaces and vibrates the ball-meeting cursor within the first range based on the batter parameter.

According to the foregoing configuration, the ball-meeting cursor position control unit controls the positioning of the ball-meeting cursor displayed in the game space according to the game player's operation. The ball-meeting cursor is a range where the ball object pitched by the pitcher character can be hit, and the game player performs the operation of moving the ball-meeting cursor so that it overlaps with the pitching trajectory of the ball object.

Here, with the present invention, the first range setting unit sets the first range to become the vibration range of the ball-meeting cursor with the ball-meeting cursor positioned at the center. In addition, the ball-meeting cursor vibration unit displaces and vibrates the ball-meeting cursor within the first range based on the batter parameter of the batter character. As a result of vibrating the ball-meeting cursor within a given range (within the first range), it will not be easy, even for a game player who is familiar with controlling the ball-meeting cursor, to easily match the position of the ball-meeting cursor to the trajectory of the ball object that was pitched. In other words, since the ball-meeting cursor is displaced and vibrated within the first range independent from the ball-meeting cursor operation of the game player, it becomes difficult for the game player to control the position of the ball-meeting cursor as he/she wishes. Consequently, regardless of whether the game player is familiar with controlling the ball-meeting cursor, the difficulty of contacting the ball object (difficulty of controlling the batter character) can be reflected in the game.

Moreover, since the level of the batter parameter concerning the batting of the batter character can also be reflected in the foregoing vibration, the ease/difficulty of the batting operation of the game player can be effectively created according to the contents of the batter parameter. In addition, since the game player can recognize the difficulty of controlling the batter character as the effect of the foregoing presentation, the game player can also be motivated to actively substitute the batter character that is difficult to control as a result of its batter parameter being decreased. It is thereby possible to realize a highly amusing baseball game filled with dynamism including the substitution of batter characters rather than playing the game only with fixed players.

(2) In the foregoing configuration, preferably, the game device further comprises a second range setting unit which sets a second range including the center of a strike zone within the strike zone, and the ball-meeting cursor vibration unit vibrates the ball-meeting cursor only when the ball-meeting cursor is positioned outside the second range.

According to the foregoing configuration, a second range including the center of the strike zone is set within the strike zone, and the ball-meeting cursor is vibrated only when the ball-meeting cursor is positioned outside the second range without vibrating the ball-meeting cursor when it is positioned within the second range. In other words, when the ball object is pitched near the middle of the strike zone, the game player will perform the operation of moving the ball-meeting cursor near the middle of the strike zone. Thus, when the ball-meeting cursor is positioned within the second range based on the foregoing operation, the game player can easily make contact with the ball object as a result of the ball-meeting cursor not being vibrated. Meanwhile, when the ball object is pitched to a difficult-to-hit zone that is away from the middle of the strike zone, the game player will perform the operation of moving the ball-meeting cursor to a position away from the middle of the strike zone. Thus, when the ball-meeting cursor is positioned outside the second range based on the foregoing operation, the ball-meeting cursor is vibrated so that it will be difficult for the game player make contact with the ball object.

This is because, in the real world also, even when the player's basic capability is relatively low or that player's condition is bad, it is unlikely that the player will mishit an easy ball that is pitched near the middle of the strike zone. Thus, the same circumstances are also reflected in the game in order to create a realistic feeling. It is thereby possible to apply an interesting presentation of vibrating the ball-meeting cursor, which was not available conventionally, and realize a highly amusing baseball game with a realistic feeling.

(3) In the foregoing configuration, preferably, the second range setting unit sets an area of the second range to be smaller as the batter parameter is lower.

According to the foregoing configuration, since the area of the second range is decreased as the batter parameter is lower and the range where the ball-meeting cursor is vibrated to make the batting operation difficult will increase, the game player can definitely realize the difficulty of controlling the batter character. This is because, in the real world also, when the player's basic capability is relatively low or that player's condition is bad, the range where the player will not mishit an easy ball that is pitched near the middle of the strike zone will also be narrowed. Thus, the same circumstances are also reflected in the game in order to create a realistic feeling. It is thereby possible to realize a highly amusing baseball game with a realistic feeling.

(4) In the foregoing configuration, preferably, the first range setting unit sets the first range to be larger as the ball-meeting cursor is positioned further toward the outside from the center of the strike zone.

According to the foregoing configuration, when the ball object is pitched near the middle of the strike zone, the game player will perform the operation of moving the ball-meeting cursor near the middle of the strike zone. Thus, as a result of decreasing the range of oscillation (first range) of the ball-meeting cursor as the ball-meeting cursor is positioned closer to the middle of the strike zone based on the foregoing operation, it will become easier for the game player to make contact with the ball object. Meanwhile, when the ball object is pitched to a difficult-to-hit zone that is away from the middle of the strike zone, the game player will perform the operation of moving the ball-meeting cursor to a position that is away from the middle of the strike zone. Thus, as a result of increasing the range of oscillation (first range) of the ball-meeting cursor as the ball-meeting cursor is positioned farther away from the middle of the strike zone based on the foregoing operation, it will become more difficult for the game player to make contact with the ball object. This is because, in the real world also, it becomes more difficult for the batter to make contact with the ball as the ball is pitched toward the outside of the strike zone from the middle of the strike zone (as the ball is in a ball zone that is farther away from the strike zone). Thus, the same circumstances are also reflected in the game in order to create a realistic feeling. It is thereby possible to realize a highly amusing baseball game with even a greater realistic feeling.

(5) In the foregoing configuration, preferably, the batter parameter setting unit includes a condition parameter setting unit which sets, as the batter parameter, a condition parameter showing a state of a good/bad condition of the batter character, and the ball-meeting cursor vibration unit vibrates the ball-meeting cursor within the first range only when the condition parameter exhibits a predetermined value or less.

When the condition parameter decreases to a predetermined value or less and the batter character's condition is bad, by vibrating the ball-meeting cursor within the first range, the badness of the batter character's condition can be reliably presented to the game player according to a definite method of vibrating the ball-meeting cursor.

In the real world, no matter how high the player's basic capability may be, it becomes difficult for that player to hit the ball skillfully during a bad condition, and the state during a bad condition is also realized in the game based on an amusing presentation of vibrating the ball-meeting cursor, which was not available conventionally. As a result of causing the game player to realize the difficulty of controlling the batter character during a bad condition, the game player can also be motivated to actively substitute the batter character, and it is thereby possible to realize a highly amusing baseball game filled with dynamism including the substitution of players.

(6) In the foregoing configuration, preferably, the batter parameter setting unit includes a condition parameter setting unit which sets, as the batter parameter, a condition parameter showing a state of a good/bad condition of the batter character, and the first range setting unit sets the first range to be larger as the condition parameter is lower.

According to the foregoing configuration, as a result of increasing the range of oscillation (first range) of the ball-meeting cursor as the condition parameter of the batter character is lower; that is, as the condition is worse, it will become more difficult for the game player to make contact with the ball object. This is because, in the real world also, it becomes more difficult for the player to make contact with the ball as that player's condition is worse, and the same circumstances are also reflected in the game in order to create a realistic feeling. It is thereby possible to realize a highly amusing baseball game with even a greater realistic feeling.

(7) In the foregoing configuration, preferably, the batter parameter setting unit includes a basic capability parameter setting unit which sets, as the batter parameter, a basic capability parameter showing a basic capability of the batter character, and the first range setting unit sets the first range to be larger as the basic capability parameter is lower.

According to the foregoing configuration, as a result of increasing the range of oscillation (first range) of the ball-meeting cursor as the basic capability parameter of the batter character is lower, it will become more difficult for the game player to make contact with the ball object. This is because, in the real world also, it is difficult for a player to skillfully make contact with the ball as that player's basic capability is lower, and the same circumstances are also reflected in the game in order to create a realistic feeling based on the vibration of the ball-meeting cursor, which was not available conventionally. It is thereby possible to realize a highly amusing baseball game with a realistic feeling.

(8) In the foregoing configuration, preferably, the batter parameter setting unit includes a batting characteristic setting unit which sets a batting characteristic parameter on skillfulness and unskillfulness of the batter character regarding a pitching zone, and the first range setting unit sets the first range based on the batting characteristic parameter so that a range corresponding to an unskillful zone of the batter character becomes greater than a skillful zone of the batter character.

According to the foregoing configuration, a batting characteristic parameter on the skillfulness and unskillfulness of the batter character is set regarding the pitching zone, and the first range of an unskillful zone of the batter character is set to be greater than a skillful zone of the batter character so that the level of difficulty of the batting operation can be changed according to the pitching zone. This is because, in the real world also, the players have skillful and unskillful pitching zones such as being skillful at the outside corner zone but being unskillful at the inside corner zone. Thus, even in the game, the adjustment of difficulty of the batting operation according to the pitching zone is realized by setting the skillfulness and unskillfulness of the batter character regarding the pitching zone and using an interesting presentation of vibrating the ball-meeting cursor, which was not available conventionally. It is thereby possible to realize a highly amusing baseball game with a realistic feeling.

(9) In the foregoing configuration, preferably, the batter parameter setting unit includes a mental parameter setting unit which sets a mental parameter according to a batting average history of the batter character during a game, and the first range setting unit sets the first range to be larger as the mental parameter is lower.

According to the foregoing configuration, as a result of setting the mental parameter according to the batting average history of the batter character during the game and increasing the range of oscillation (first range) of the ball-meeting cursor as the mental parameter of the batter character is lower, it will become more difficult for the game player to make contact with the ball object. This is because, in the real world also, for example, when a batter strikes out in three consecutive at-bats, that batter tends to get negative thinking that he/she may not be able to hit the ball in the subsequent at-bats, and often fails to achieve good results in the subsequent at-bats. Thus, in the game also, the evaluation of the mental aspect is reflected in the difficulty of the batting operation by evaluating the mental aspect according to the batting average history during the game, setting the mental parameter to the respective batter characters, and using an interesting presentation of vibrating the ball-meeting cursor, which was not available conventionally. It is thereby possible to realize a highly amusing baseball game with even a greater realistic feeling.

(10) In the foregoing configuration, preferably, the ball-meeting cursor vibration unit sets speed of the ball-meeting cursor that passes through a center-side range of the first range to be faster than speed of the ball-meeting cursor that passes through a range other than the center-side range.

When the ball-meeting cursor is vibrating within the first range, the mindset of a general game player will be to contact the ball object with a position near the center of the vibrating range as the target. Thus, as a result of increasing the speed of the ball-meeting cursor that passes through the center-side range near the center of the range (first range) where the ball-meeting cursor is vibrating to be faster than the other ranges, it will become more difficult to make contact with the ball object using the ball-meeting cursor, and the game player can further realize the difficulty of controlling the batter character.

This application is based on Japanese Patent Application Serial No. 2010-242641 filed in Japan Patent Office on Oct. 28, 2010 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A game device which executes a baseball game in which a batter character hits a ball object that is pitched by a pitcher character, comprising:

a ball-meeting cursor position control unit which controls positioning of a ball-meeting cursor, in a game space, showing a range where the batter character can hit the ball object according to an operation of a game player;

a batter parameter setting unit which sets a batter parameter of the batter character in relation to batting of that batter character;

a first range setting unit which sets a first range where the ball-meeting cursor is positioned at the center; and a ball-meeting cursor vibration unit which displaces and vibrates the ball-meeting cursor within the first range based on the batter parameter.

2. The game device according to claim 1, further comprising a second range setting unit which sets a second range including the center of a strike zone within the strike zone,
wherein the ball-meeting cursor vibration unit vibrates the ball-meeting cursor only when the ball-meeting cursor is positioned outside the second range.

3. The game device according to claim 2, wherein the second range setting unit sets an area of the second range to be smaller as the batter parameter is lower.

4. The game device according to claim 1, wherein the first range setting unit sets the first range to be larger as the ball-meeting cursor is positioned further toward the outside from the center of the strike zone.

5. The game device according to claim 1, wherein
the batter parameter setting unit includes a condition parameter setting unit which sets, as the batter parameter, a condition parameter showing a state of a good/bad condition of the batter character, and
the ball-meeting cursor vibration unit vibrates the ball-meeting cursor within the first range only when the condition parameter exhibits a predetermined value or less.

6. The game device according to claim 1, wherein
the batter parameter setting unit includes a condition parameter setting unit which sets, as the batter parameter, a condition parameter showing a state of a good/bad condition of the batter character, and
the first range setting unit sets the first range to be larger as the condition parameter is lower.

7. The game device according to claim 1, wherein
the batter parameter setting unit includes a basic capability parameter setting unit which sets, as the batter parameter, a basic capability parameter showing a basic capability of the batter character, and
the first range setting unit sets the first range to be larger as the basic capability parameter is lower.

8. The game device according to claim 1, wherein
the batter parameter setting unit includes a batting characteristic setting unit which sets a batting characteristic parameter on skillfulness and unskillfulness of the batter character regarding a pitching zone, and
wherein the first range setting unit sets the first range based on the batting characteristic parameter so that a range corresponding to an unskillful zone of the batter character becomes greater than a skillful zone of the batter character.

9. The game device according to claim 1, wherein
the batter parameter setting unit includes a mental parameter setting unit which sets a mental parameter according to a batting average history of the batter character during a game, and
the first range setting unit sets the first range to be larger as the mental parameter is lower.

10. The game device according to claim 1, wherein the ball-meeting cursor vibration unit sets speed of the ball-meeting cursor that passes through a center-side range of the first range to be faster than speed of the ball-meeting cursor that passes through a range other than the center-side range.

11. A game control method of in which a computer controls a baseball game where a batter character hits a ball object that is pitched by a pitcher character,
the method comprising:
a ball-meeting cursor position control step in which the computer controls positioning of a ball-meeting cursor, in a game space, showing a range, where the batter character can hit the ball object, according to an operation of a game player;
a batter parameter setting step in which the computer sets a batter parameter of the batter character in relation to the batting of that batter character;
a first range setting step in which the computer sets a first range where the ball-meeting cursor is positioned at the center; and
a ball-meeting cursor vibration step in which the computer displaces and vibrates the ball-meeting cursor within the first range based on the batter parameter.

12. A computer-readable recording medium recorded with a program which causes a computer including a baseball game where a batter character hits a ball object that is pitched by a pitcher character to execute:
a ball-meeting cursor position control function which controls positioning of a ball-meeting cursor, in a game space, showing a range, where the batter character can hit the ball object, according to an operation of a game player;
a batter parameter setting function which sets a batter parameter of the batter character in relation to the batting of that batter character;
a first range setting function which sets a first range where the ball-meeting cursor is positioned at the center; and
a ball-meeting cursor vibration function which displaces and vibrates the ball-meeting cursor within the first range based on the batter parameter.

* * * * *